(12) United States Patent
Yoshioka et al.

(10) Patent No.: US 12,022,468 B2
(45) Date of Patent: Jun. 25, 2024

(54) USER TERMINAL

(71) Applicant: NTT DOCOMO, INC., Tokyo (JP)

(72) Inventors: Shohei Yoshioka, Tokyo (JP); Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 449 days.

(21) Appl. No.: 17/279,225

(22) PCT Filed: Sep. 25, 2018

(86) PCT No.: PCT/JP2018/035533
§ 371 (c)(1),
(2) Date: Mar. 24, 2021

(87) PCT Pub. No.: WO2020/065740
PCT Pub. Date: Apr. 2, 2020

(65) Prior Publication Data
US 2022/0053483 A1    Feb. 17, 2022

(51) Int. Cl.
*H04W 72/21* (2023.01)
*H04W 72/1268* (2023.01)
*H04W 88/08* (2009.01)

(52) U.S. Cl.
CPC ....... *H04W 72/21* (2023.01); *H04W 72/1268* (2013.01); *H04W 88/08* (2013.01)

(58) Field of Classification Search
CPC ..... H04W 72/21; H04W 72/20; H04W 88/02; H04W 72/1268
See application file for complete search history.

(56) References Cited

U.S. PATENT DOCUMENTS

| | | | | |
|---|---|---|---|---|
| 10,880,918 | B2* | 12/2020 | Lee | H04W 72/1268 |
| 2020/0245321 | A1* | 7/2020 | Choi | H04W 72/21 |
| 2022/0053483 | A1* | 2/2022 | Yoshioka | H04W 72/21 |
| 2022/0394740 | A1* | 12/2022 | Choi | H04L 5/0055 |

OTHER PUBLICATIONS

International Search Report issued in PCT/JP2018/035533 dated Oct. 30, 2018 (1 page).
Written Opinion of the International Searching Authority issued in PCT/JP2018/035533 dated Oct. 30, 2018 (4 pages).
MediaTek; "Remaining issues of PUCCH"; 3GPP TSG RAN WG1 Meeting #94, R1-1808260; Gothenburg, Sweden; Aug. 20-24, 2018 (11 pages).

(Continued)

*Primary Examiner* — Raj Jain
(74) *Attorney, Agent, or Firm* — Osha Bergman Watanabe & Burton LLP

(57) ABSTRACT

A user terminal according to one aspect of the present disclosure includes: a transmitting section that transmits uplink control information; and a control section that determines an uplink control channel used for transmitting the uplink control information based on traffic types of each of a first uplink control channel and a second uplink control channel when the first uplink control channel transmitted repeatedly one or more times and the second uplink control channel transmitted repeatedly one or more times overlap in a slot.

7 Claims, 16 Drawing Sheets

(56) References Cited

OTHER PUBLICATIONS

CATT; "Considerations on UCI multiplexing for NR URLLC"; 3GPP TSG RAN WG1 Meeting #93, R1-1806297; Busan, Korea; May 21-25, 2018 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E- Utran); Overall description; Stage 2 (Release 8)"; Mar. 2010 (149 pages).

\* cited by examiner

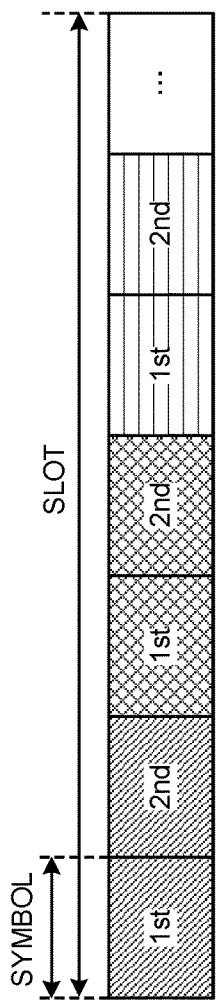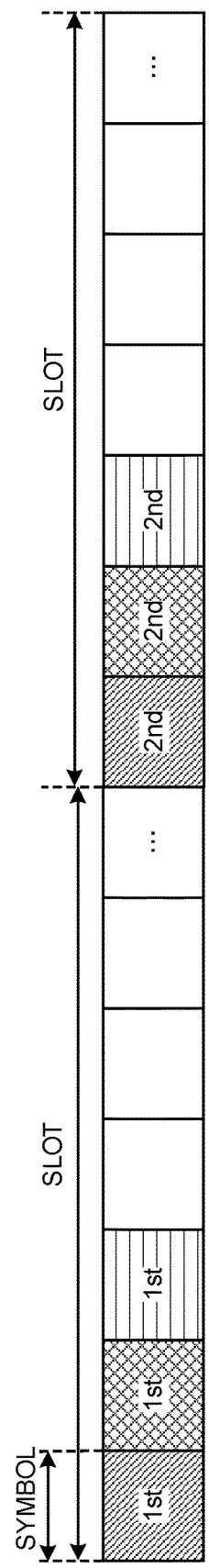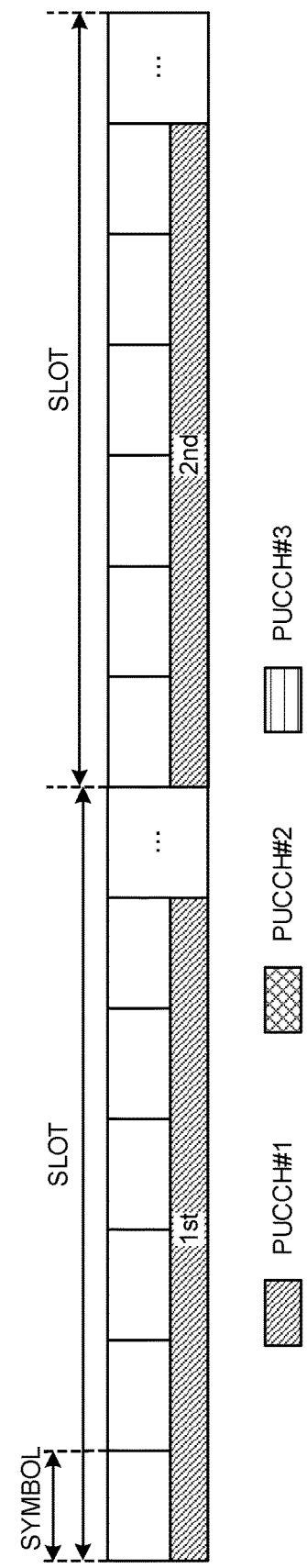

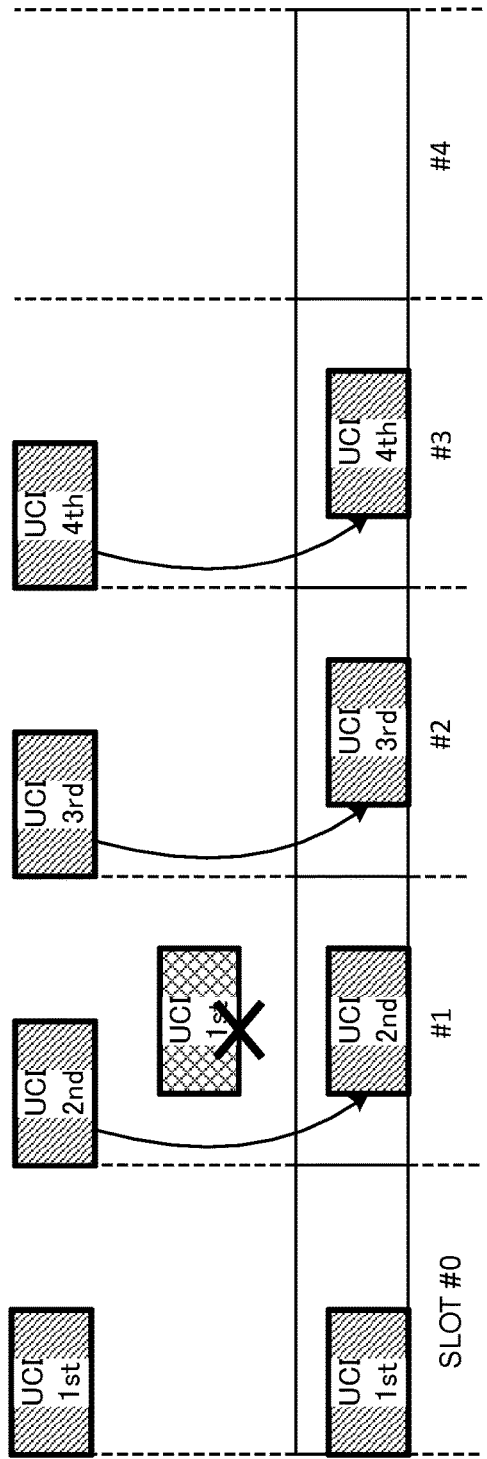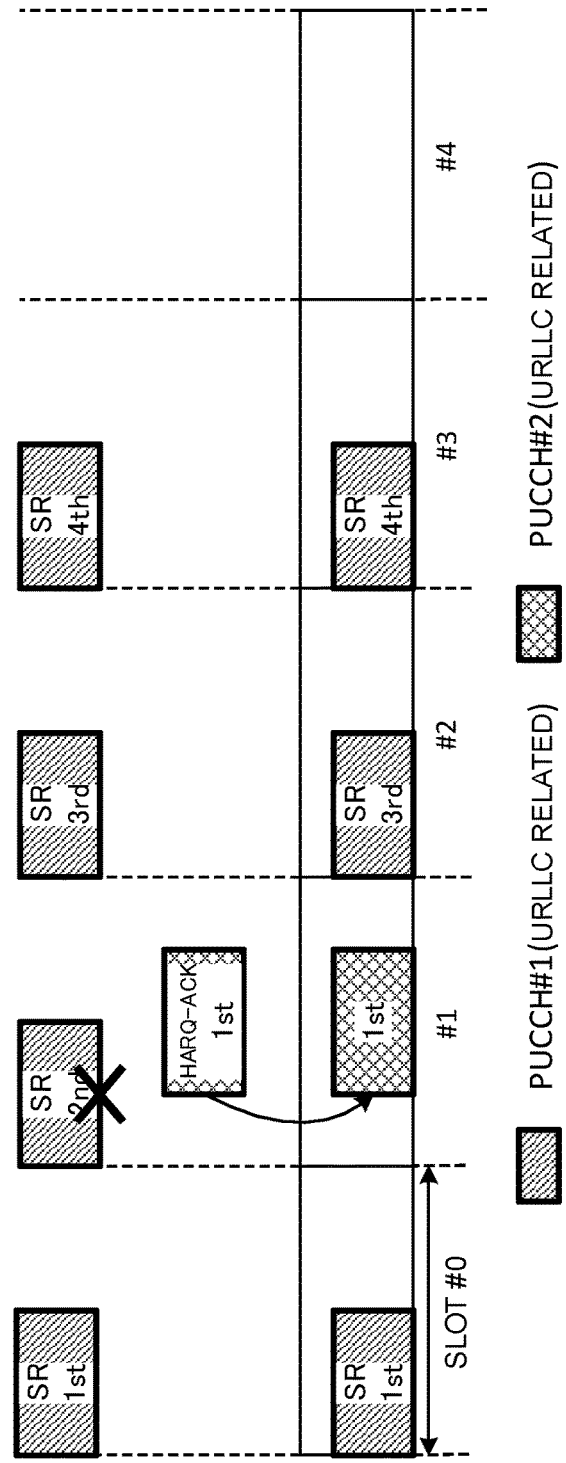
FIG. 6A
FIG. 6B

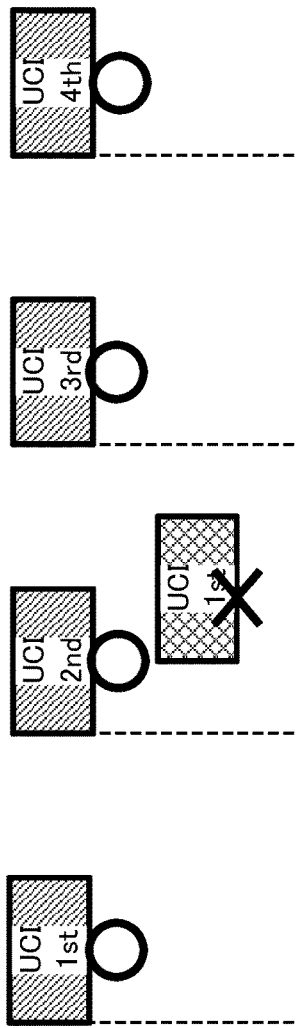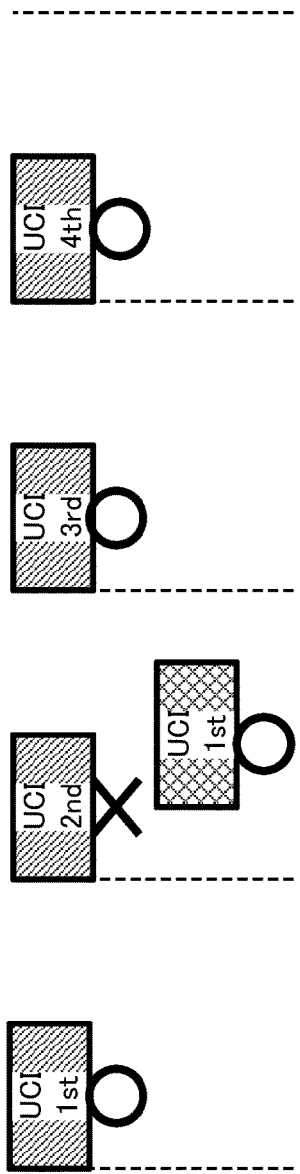
FIG. 7A
FIG. 7B

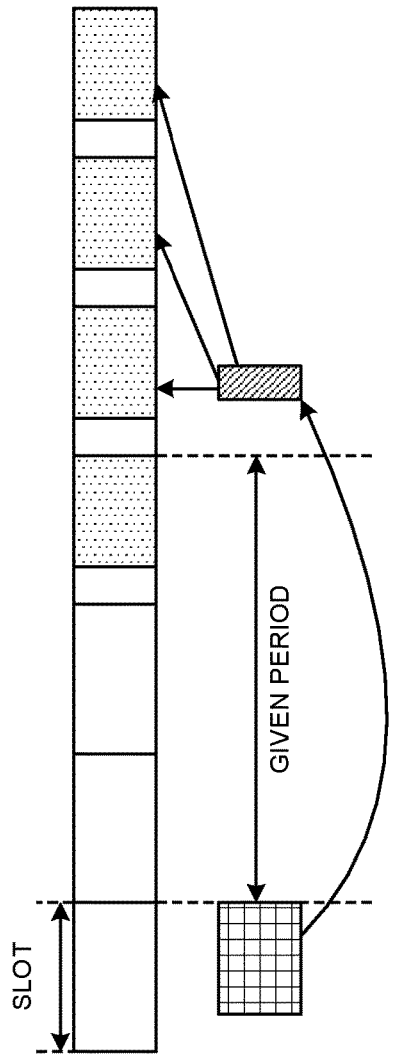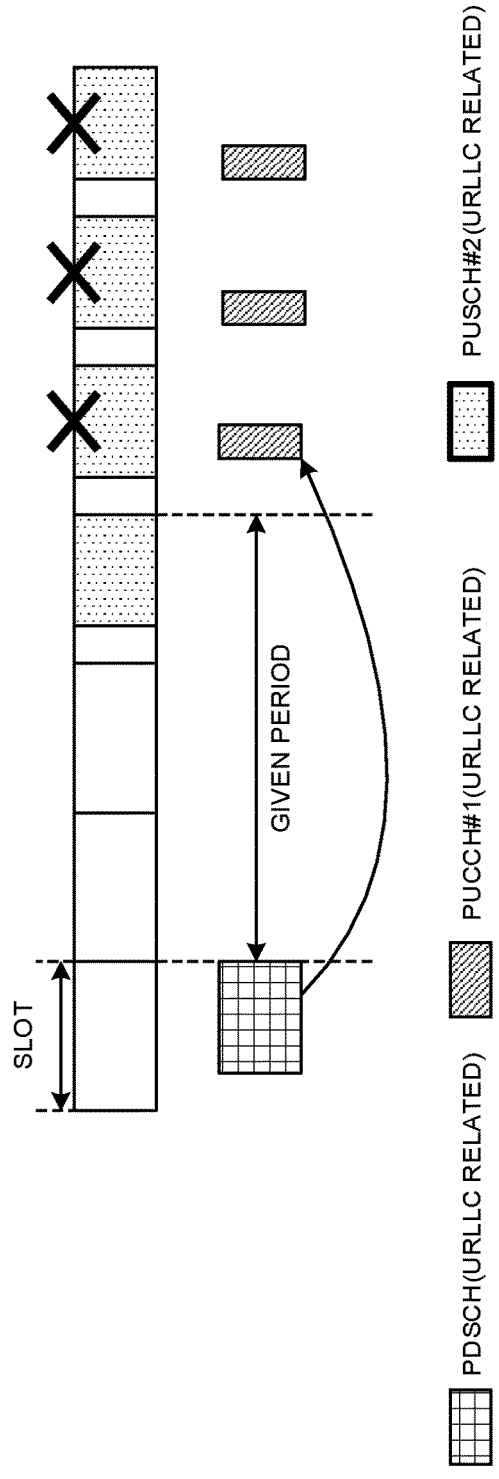
FIG. 9A
FIG. 9B

USER TERMINAL

TECHNICAL FIELD

The present disclosure relates to a user terminal in a next-generation mobile communication system.

BACKGROUND ART

In the universal mobile telecommunications system (UMTS) network, the specifications of long-term evolution (LTE) have been drafted for the purpose of further increasing high speed data rates, providing lower delays, and so on (see Non-Patent Literature 1). Further, the specifications of LTE Advanced (LTE-A, 3GPP release (Rel.) 10, 11, 12, 13, 14) have been made for the purpose of further increasing the capacity and advancement of LTE (3GPP Rel. 8, 9).

Successor systems of LTE (for example, also referred to as Future Radio Access (FRA), 5th generation mobile communication system (5G), 5G+(plus), New Radio (NR), New radio access (NX), Future generation radio access (FX), LTE Rel. 14 or 15 or later versions) are also under study.

In the existing LTE systems, a user terminal transmits uplink control information (UCI) by using an uplink control channel (for example, physical uplink control channel (PUCCH)) or an uplink shared channel (for example, physical uplink shared channel (PUSCH)).

The UCI may include at least one of delivery acknowledgement information (Hybrid Automatic Repeat request-ACKnowledge (HARQ-ACK), acknowledge/non-ack (ACK/NACK)) for downlink shared channel (for example, physical downlink shared channel (PDSCH)), scheduling request (SR), and channel state information (CSI).

CITATION LIST

Non Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (hereinafter, also referred to as NR), a method including repetition transmission of uplink control channel (for example, PUCCH) and uplink shared channel (for example, PUSCH) is under consideration.

In NR, it is assumed that the uplink control channel transmitted repeatedly one or more times and another uplink control channel or uplink shared channel transmitted repeatedly one or more times overlap in the same slot. How to control at least one of the transmission and multiplexing of uplink control information (UCI) when the overlapping occurs has not been sufficiently examined.

Therefore, one of objects of the present disclosure is to provide a user terminal capable of appropriately controlling at least one of transmission and multiplexing of UCI when an uplink control channel that is transmitted repeatedly one or more times and another uplink control channel or uplink shared channel that is transmitted repeatedly one or more times overlap in the same slot.

Solution to Problem

A user terminal according to one aspect of the present disclosure includes: a transmitting section that transmits uplink control information; and a control section that determines an uplink control channel used for transmitting the uplink control information based on traffic types of each of a first uplink control channel and a second uplink control channel when the first uplink control channel that is transmitted repeatedly one or more times and the second uplink control channel that is transmitted repeatedly one or more times overlap in a slot.

A user terminal according to one aspect of the present disclosure includes: a transmitting section that transmits uplink control information; and a control section that determines an uplink channel used for transmitting the uplink control information based on traffic types of each of an uplink control channel and an uplink shared channel when the uplink control channel that is transmitted repeatedly one or more times and the uplink shared channel that is transmitted repeatedly one or more times overlap in a slot.

Advantageous Effects of Invention

According to one aspect of the present disclosure, it is possible to appropriately control at least one of transmission and multiplexing of UCI when an uplink control channel that is transmitted repeatedly one or more times and another uplink control channel or uplink shared channel that is transmitted repeatedly one or more times overlap in the same slot.

BRIEF DESCRIPTION OF DRAWINGS

FIGS. 1A to 1C are diagrams illustrating an example of repetition transmission according to an embodiment.

FIGS. 6A and 6B are diagrams illustrating an example of collision handling according to Aspect 1.2.1.

FIGS. 7A and 7B are diagrams illustrating an example of collision handling according to Aspect 1.2.2 and Aspect 1.2.3.

FIGS. 9A and 9B are diagrams illustrating an example of collision handling between URLLCs according to Aspect 2.1.2.1.

DESCRIPTION OF EMBODIMENTS

Figure 2:
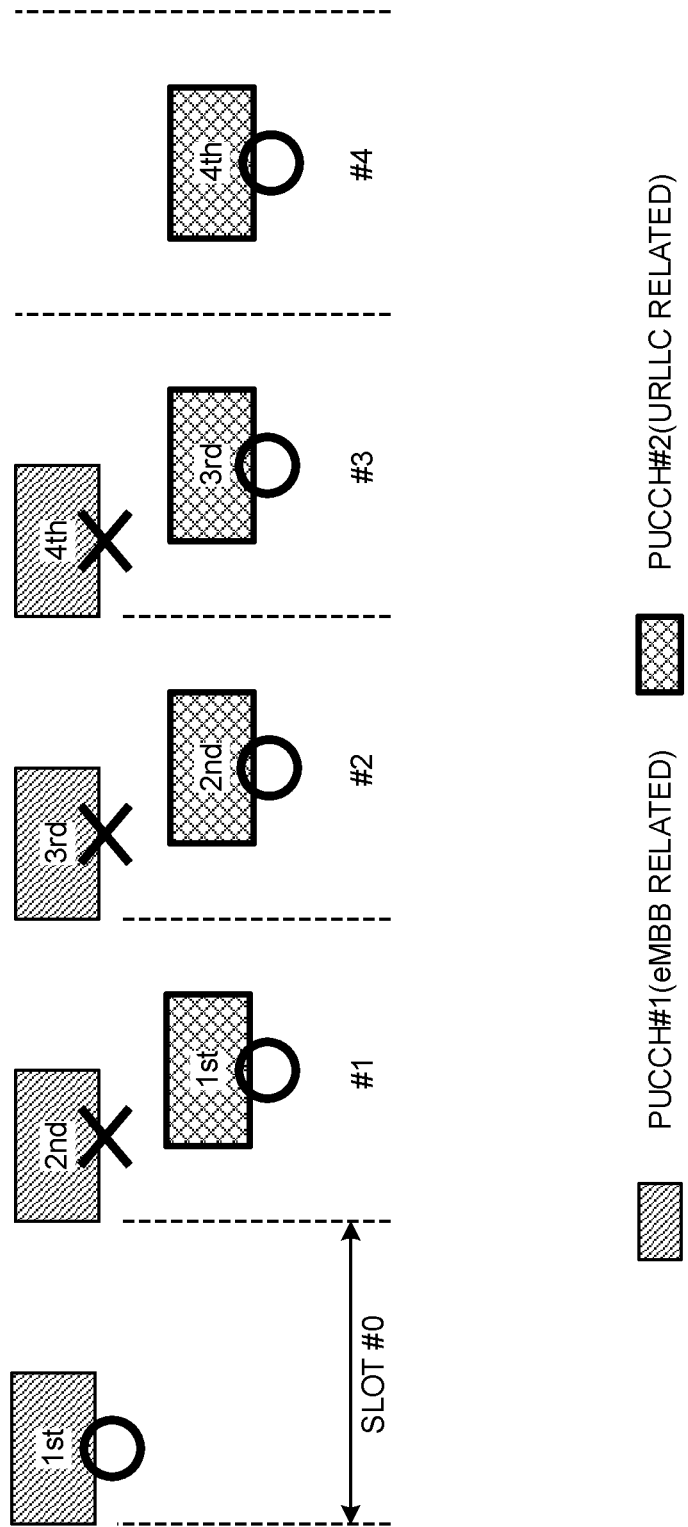
FIG. 2 is a diagram illustrating an example of collision handling between different traffic types according to Aspect 1.1.1.

In NR, a method including repetition transmission of uplink control channel (for example, PUCCH) and uplink shared channel (for example, PUSCH) is under consideration.

For example, in repetition transmission of PUCCH, a method of duplicating (copying) and transmitting the same PUCCH (or the same UCI) over a plurality of slots (for example, consecutive slots) or a plurality of symbols (for example, consecutive symbols) is under consideration.

In repetition transmission of the PUSCH, a method of duplicating (copying) and transmitting the same PUSCH (or the same data) over a plurality of slots (for example, consecutive slots) or a plurality of symbols (for example, consecutive symbols) is under consideration.

Here, duplicating the same PUCCH (UCI) or PUSCH (data (at least one of a higher layer parameter and user data)) may not necessarily refer to duplicating all of the same bit sequence, but may instead refer to duplicating at least a portion of a codeword generated from the same information bit sequence or at least a portion of a modulation symbol sequence.

For example, among duplicated pieces of UCI or duplicated pieces of data, a redundancy version (RV) of a codeword obtained by encoding a certain information bit sequence may be the same and may be different.

In NR, it is assumed that a PUCCH transmitted repeatedly one or more times and a PUCCH or PUSCH transmitted repeatedly one or more times overlap in the same slot. However, how to control at least one of the transmission and multiplexing of UCI when the overlapping occurs (how to perform collision handling) has not been sufficiently examined.

For example, in 3GPP Rel. 15 (also referred to as NR Rel. 15, 5G, or the like), collision handling when a PUCCH (also referred to as multi-slot PUCCH or the like) that is transmitted repeatedly a plurality of times over a plurality of slots and a PUCCH (single slot PUCCH) transmitted only one time in a single slot overlap in the same slot is still in the stage for further study (FFS). Therefore, the problem is how to perform collision handling when the multi-slot PUCCH and the single slot PUCCH overlap.

In NR, it is assumed that a UE performs a plurality of communications (a plurality of communications with different traffic types) related to a plurality of services with different requirements (for example, ultra reliable and low latency communications (URLLC)) and enhanced mobile broad band (eMBB)).

In particular, in 3GPP Rel. 16 (also referred to as NR Rel. 16, 5G+, or the like), URLLC requirements enhancement (for example, requirements for reliability and delay stricter than Rel. 15 are imposed) is assumed. However, as a result of inappropriate collision handling when a PUCCH transmitted repeatedly one or more times and another PUCCH or PUSCH transmitted repeatedly one or more times overlap in the same slot, a requirement of the URLLC may not be met appropriately.

Therefore, the present inventors have conceived of performing collision handling based on a traffic type when a PUCCH transmitted repeatedly one or more times and another PUCCH or PUSCH transmitted repeatedly one or more times overlap in the same slot (see Aspects 1.1 and 2.1 below). In addition, the present inventors have conceived of performing collision handling more appropriately even when traffic types are not distinguished (see Aspect 1.2 below).

Hereinafter, an embodiment according to the present disclosure will be described in detail with reference to the drawings.

(Traffic Type)

A traffic type according to an embodiment of the present disclosure indicates a type of service such as URLLC or eMBB. The traffic type may be identified in the physical layer based on at least one of the following.

Logical channels with different priorities
Modulation and coding scheme (MCS) table (MCS index table)
DCI format
System information-radio network temporary identifier (RNTI) used for scrambling (masking) of cyclic redundancy check (CRC) bit included in (added to) the DCI (DCI format)
Radio resource control (RRC) parameter
Specific RNTI (for example, RNTI for URLLC, MCS-C-RNTI, or the like)
Search space
Given field in DCI (for example, reuse of newly added field or existing field)

Specifically, a traffic type of the HARQ-ACK for a PDSCH may be determined based on at least one of the following.

MCS index table used to determine at least one of the modulation order, target code rate, and transport block size (TBS) of the PDSCH (for example, whether to use MCS index table 3)
RNTI used for CRC scrambling of DCI used for scheduling the PDSCH (for example, whether CRC scrambled with C-RNTI or MCS-C-RNTI)

A traffic type of the SR may be determined based on a higher layer parameter used as an SR identifier (SR-ID). The higher layer parameter may indicate whether the traffic type of the SR is eMBB or URLLC.

A traffic type of the CSI may be determined based on configuration information related to CSI report (CSI report setting). The configuration information may indicate whether the traffic type of the CSI is eMBB or URLLC. The configuration information may be a higher layer parameter.

A traffic type of the PUSCH may be determined based on at least one of the following.

MCS index table used to determine at least one of the modulation order, target code rate, and TBS of the PUSCH (for example, whether to use MCS index table 3).
RNTI used for CRC scrambling of DCI used for scheduling the PUSCH (for example, whether CRC scrambled with C-RNTI or MCS-C-RNTI)

(Repetition Transmission)

In one embodiment of the present disclosure, a PUCCH may have a format composed of a relatively small number of symbols (for example, 1 or 2 symbols) (also referred to as, for example, PUCCH format 0 or 2, short PUCCH, or mini-slot PUCCH), or may have a format composed of a relatively large number of symbols (for example, 3 to 14 symbols) (also referred to as, for example, PUCCH format 1, 3, or 4, or long PUCCH).

The repetition transmission of a PUCCH and a PUSCH may be performed in symbol units in a single slot, or may be performed in slot units in a plurality of slots.

FIGS. 1A to 1C are diagrams illustrating an example of repetition transmission according to an embodiment. FIGS. 1A and 1B illustrate an example in which short PUCCHs #1 to #3 of one symbol are transmitted repeatedly twice. FIG. 1C illustrates an example in which a 6-symbol long PUCCH #1 is transmitted repeatedly twice.

As illustrated in FIG. 1A, each of the short PUCCHs #1 to #3 may be repeated in a plurality of symbols (for example, consecutive symbols) in the same slot. Alternatively, as illustrated in FIG. 1B, each of the short PUCCHs #1 to #3 may be repeated in a given symbol (for example, a symbol having the same index) in a plurality of slots (for example, consecutive slots). Further, as illustrated in FIG. 1C, the long PUCCH #1 may be repeated in a given symbol (for example, a symbol having the same index) in a plurality of slots (for example, consecutive slots).

The repetition transmission illustrated in FIGS. 1A and 1B can be appropriately applied not only to the short PUCCH but also to the long PUCCH or PUSCH. The repetition transmission illustrated in FIG. 1C can be applied not only to the long PUCCH but also to the PUSCH. Hereinafter, when short PUCCH and long PUCCH are not particularly distinguished, they are collectively referred to as PUCCH.

As illustrated in FIGS. 1B and 1C, a PUCCH that is repeated in a plurality of slots (over multiple slots) may be referred to as a "multi-slot PUCCH" or the like. The short PUCCH illustrated in FIG. 1B may be referred to as "multi-mini slot PUCCH" or the like. As illustrated in FIG. 1A, a PUCCH that is repeated in a plurality of symbols in the same slot may be referred to as a "multi-symbol PUCCH" or the like. A PUCCH to which the repeated transmission is not applied may be referred to as "single slot PUCCH" or the like.

A PUSCH that is repeated a plurality of times in a plurality of slots (over multiple slots) may be referred to as "multi-slot PUSCH" or the like. A PUSCH transmitted only once in a single slot (repeated transmission is not applied) may be referred to as "single slot PUSCH" or the like. A PUSCH that is repeated in a plurality of symbols in the same slot may be referred to as "multi-symbol PUSCH" or the like.

Although the description below will focus on PUCCH or PUSCH (multi-slot PUCCH or multi-slot PUSCH) that is repeated in slot units, the present disclosure can be appropriately applied to PUCCH or PUSCH (multi-symbol PUCCH or multi-symbol PUSCH) that is repeated in symbol units.

(Aspect 1)

In Aspect 1, collision handling when a PUCCH (single/multi-slot PUCCH) transmitted in one or a plurality of slots and a PUCCH (single/multi-slot PUCCH) transmitted in one or a plurality of slots overlap will be described.

(Aspect 1.1) when Distinguishing Traffic Types

Collision handling when the multi-slot PUCCH and the single/multi-slot PUCCH overlap when the traffic types are distinguished (for example, Rel. 16) will be described.

(Aspect 1.1.1) Duplicate Between PUCCHs of Different Traffic Types

When the traffic type differs between the multi-slot PUCCH and the single/multi-slot PUCCH overlapping in the same slot, the UE may determine the PUCCH to be transmitted in the slot based on the priority of the traffic type. The priority of the traffic type may be, for example, URLLC-related>eMBB-related.

FIG. 2 is a diagram illustrating an example of collision handling between different traffic types according to Aspect 1.1.1. FIG. 2 illustrates an example in which a multi-slot PUCCH #1 with a traffic type related to eMBB and a multi-slot PUCCH #2 with a traffic type related to URLLC overlap in at least one repetition (slot).

As illustrated in FIG. 2, when multi-slot PUCCHs #1 and #2 of different traffic types overlap in the same slots #1 to #3, in the slots #1 to #3, the multi-slot PUCCH #2 having a higher priority traffic type (for example, URLLC related) may be transmitted and the multi-slot PUCCH #1 of the low priority traffic type (for example, eMBB related) does not have to be transmitted. In this case, in the slots #1 to #3, the UE may drop the UCI included in the multi-slot PUCCH #1.

(Aspect 1.1.2) Duplicate Between PUCCHs of the Same Traffic Type

Next, collision handling when the traffic types of the multi-slot PUCCH and the single/multi-slot PUCCH overlapping in the same slot are the same (for example, both are related to URLLC) will be described. The UE can perform the first to third URLLC collision handling below. When both the traffic type of the multi-slot PUCCH and the traffic type of the single/multi-slot PUCCH are eMBB-related, similar control to any of the first to third URLLC collision handling below may be performed, and different control from the first to third URLLC collision handling below may be performed.

(Aspect 1.1.2.1) First Collision Handling Between URLLCs

In first URLLC collision handling, the UE may perform collision handling between a URLLC-related multi-slot PUCCH and a single-slot PUCCH or a multi-slot PUCCH overlapping in the same slot based on at least one of the UCI type (for example, HARQ-ACK, SR, first CSI (higher priority CSI), second CSI (lower priority CSI), or the like), and a start timing of repetition.

Figure 3A:
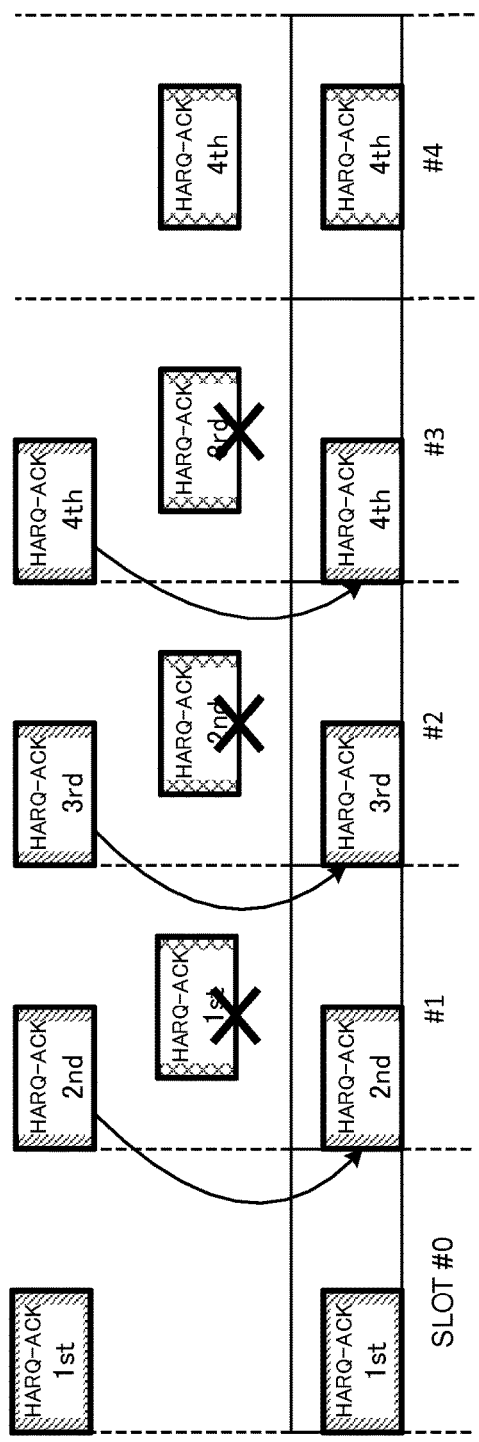
FIGS. 3A and 3B are diagrams illustrating an example of collision handling between URLLCs according to Aspect 1.1.2.1.
Figure 3B:
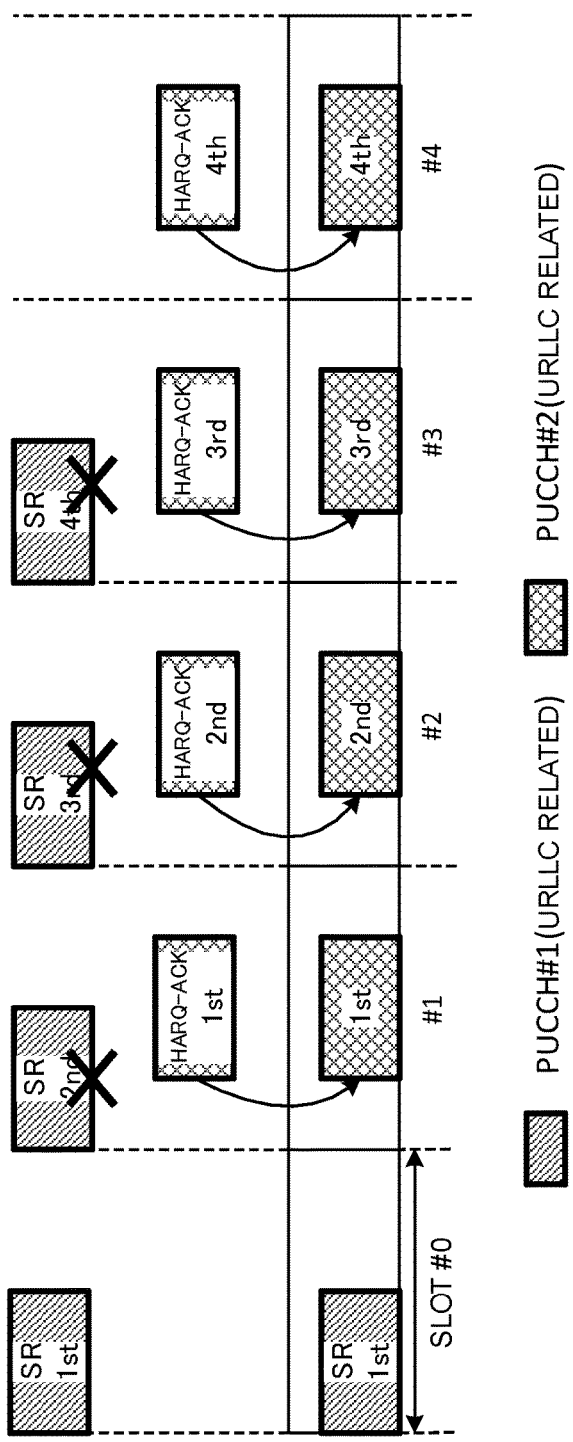

FIGS. 3A and 3B are diagrams illustrating an example of collision handling between URLLCs according to Aspect 1.1.2.1. FIGS. 3A and 3B illustrate an example in which the multi-slot PUCCH #1 and the multi-slot PUCCH #2, whose traffic types are related to the URLLC, overlap in at least one repetition (slot).

When the UCI priority included in the multi-slot PUCCH #1 and the UCI priority included in the multi-slot PUCCH #2 are the same (for example, both include HARQ-ACK), the UE may transmit the multi-slot PUCCH #1 that has started in the earlier slot, and does not have to transmit the multi-slot PUCCH #2 that has started in the later slot in the slots #1 to #3 in which the multi-slot PUCCHs #1 and #2 overlap, as illustrated in FIG. 3A.

On the other hand, when the priority of the UCI included in the multi-slot PUCCH #1 and the priority of the UCI included in the multi-slot PUCCH #2 are different, in the slots #1 to #3 in which the multi-slot PUCCHs #1 and #2 overlap, as illustrated in FIG. 3B, the UE may transmit the PUCCH including the UCI having a high priority and does not have to transmit the PUCCH including the UCI having a low priority.

Here, the priority of the UCI type may be determined in the order of HARQ-ACK>SR>first CSI>second CSI, for example. For example, in FIG. 3B, since the multi-slot PUCCH #1 includes the SR and the multi-slot PUCCH #2 includes the HARQ-ACK, the UE may transmit the multi-slot PUCCH #2 including the HARQ-ACK having a high priority in the slots #1 to #3.

(Aspect 1.1.2.2) Second Collision Handling Between URLLCs

In second collision handling between URLLCs, when a URLLC-related multi-slot PUCCH and a URLLC-related single/multi-slot PUCCH overlap in at least one slot (repetition), the UE may perform collision handling using a dedicated multi-slot PUCCH.

Figure 4:
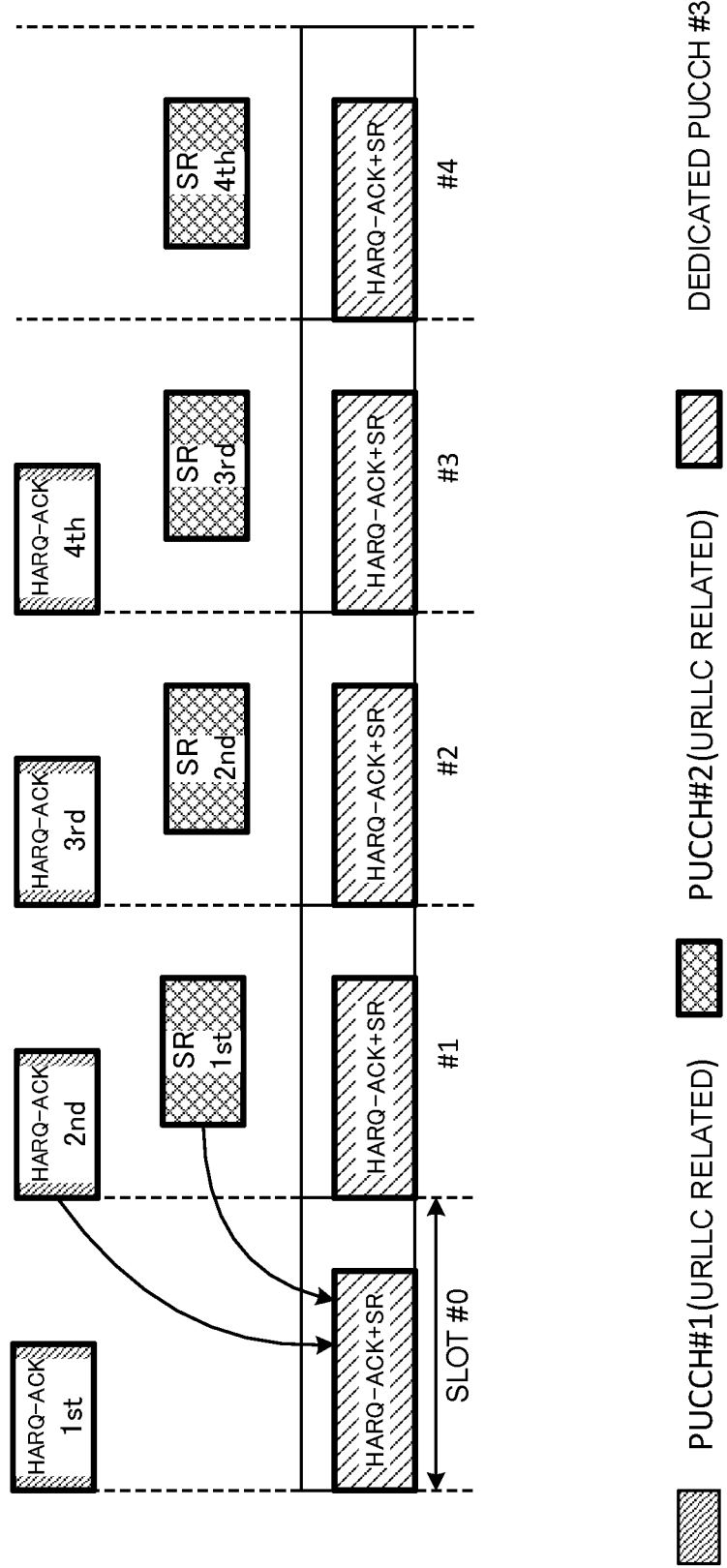
FIG. 4 is a diagram illustrating an example of collision handling between URLLCs according to Aspect 1.1.2.2.

FIG. 4 is a diagram illustrating an example of collision handling between URLLCs according to Aspect 1.1.2.2. FIG. 4 illustrates an example in which the multi-slot PUCCH #1 and the multi-slot PUCCH #2, whose traffic types are related to the URLLC, overlap in at least one repetition (slot).

As illustrated in FIG. 4, the UE may multiplex pieces of UCI included in each of the multi-slot PUCCHs #1 and #2 in the multi-slot PUCCH #3. The multi-slot PUCCH #3 may be repeated over five slots from the slot #0, which is the same as the earliest PUCCH resource in the multi-slot PUCCHs #1 and #2, to the slot #4, which is the same as the last PUCCH resource.

For example, in FIG. 4, the UE may multiplex HARQ-ACK included in the multi-slot PUCCH #1 repeated four times and SR included in the multi-slot PUCCH #2 repeated four times in the multi-slot PUCCH #3 repeated five times.

As illustrated in FIG. 4, UCI multiplexing for the multi-slot PUCCH #3, which is different from the multi-slot PUCCHs #1 and #2, may be applied when the earliest PUCCH resource satisfies the timeline condition for UCI transmission.

Here, the timeline condition may mean that, for example, the PUCCH resource for HARQ-ACK is provided after a given period with reference to the final symbol (or the symbol next to the final symbol) of the PDSCH.

For example, in FIG. 4, since the earliest PUCCH resource (resource for multi-slot PUCCH #1 in the slot #0) satisfies the UCI timeline condition included in each of the multi-slot PUCCHs #1 and #2, the UE may multiplex the HARQ-ACK of the multi-slot PUCCH #1 and the SR of the multi-slot PUCCH #2 in the multi-slot PUCCH #3.

On the other hand, since the earliest PUCCH resource (resource for the multi-slot PUCCH #1 in the slot #0) does not satisfy the UCI timeline condition included in the multi-slot PUCCH #2, the UE does not have to perform UCI multiplexing for the multi-slot PUCCH #3 illustrated in FIG. 4. In this case, the UE may perform collision handling of the multi-slot PUCCHs #1 and #2 based on at least one of the UCI type and the start timing of the repetition, as similar to the first collision handling between URLLCs.

The resource for the multi-slot PUCCH #3 may be specified based on at least one of a higher layer parameter and DCI. The DCI may be a given field in a DL assignment (for example, DCI format 1_0 or 1_1) or may be a new format DCI.

(Aspect 1.1.2.3) Third Collision Handling Between URLLCs

In third collision handling between URLLCs, when a URLLC-related multi-slot PUCCH and a URLLC-related single/multi-slot PUCCH overlap in at least one slot (repetition), the UE may perform collision handling for each of overlapping slots.

Figure 5:
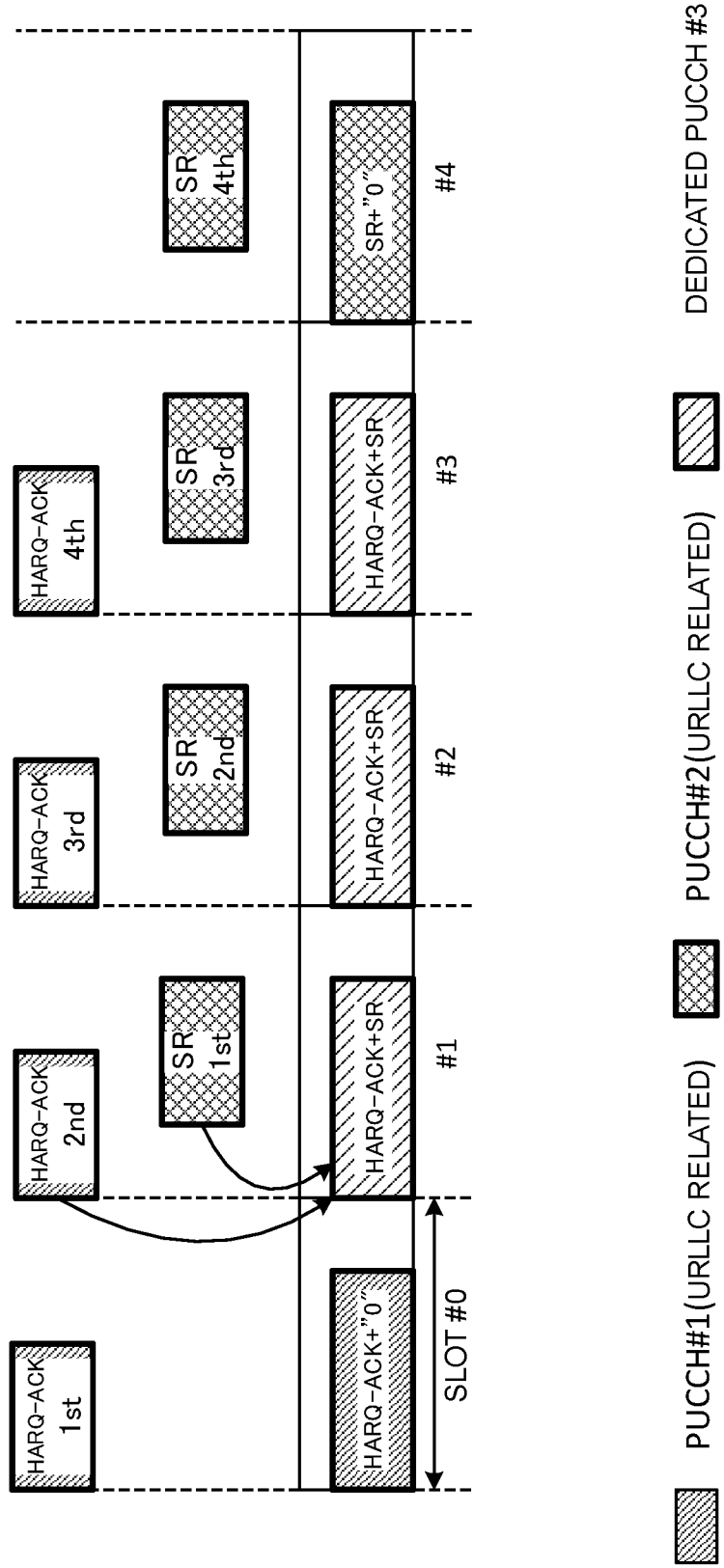
FIG. 5 is a diagram illustrating an example of collision handling between URLLCs according to Aspect 1.1.2.3.

FIG. 5 is a diagram illustrating an example of collision handling between URLLCs according to Aspect 1.1.2.3. FIG. 5 illustrates an example in which the multi-slot PUCCH #1 and the multi-slot PUCCH #2, whose traffic types are related to the URLLC, overlap in at least one repetition (slot).

As illustrated in FIG. 5, the UE may apply collision handling between single slot PUCCHs in each slot in which the multi-slot PUCCHs #1 and #2 overlap (here, the slots #1 to #3).

In collision handling between single-slot PUCCHs, HARQ-ACK is multiplexed into at least one of SR and CSI (for example, P-CSI or SP-CSI) and transmitted in a single PUCCH.

For example, in FIG. 5, in each of slots #1 to #3, the UE may multiplex the UCI of both PUCCHs #1 and #2 (HARQ-ACK and SR in FIG. 5) and transmit the multiplexed UCI by using a dedicated PUCCH #3. Here, in order to soft combine the PUCCH, it is necessary that the payload size of the PUCCH (the size of the UCI) is the same between repetitions.

Therefore, in FIG. 5, zero-padding (insertion of zero) or UCI repetition may be applied to the UCI included in the PUCCH #1 of the slot #0 so as to match the UCI included in the PUCCH of the slots #1 to #3. The same applies to the UCI included in the PUCCH #2 in the slot #4.

For example, when the HARQ-ACK of the PUCCH #1 is 3-bit data and the SR of the PUCCH #2 is 1 bit, since 4 bits in total of HARQ-ACK and SR are transmitted in the PUCCH #3, 1-bit zero may be inserted in the PUCCH #1 of the slot #1, and a 3-bit zero may be inserted in the PUCCH #2 in the slot 4.

(Aspect 1.2) when not Distinguishing Traffic Types

Next, collision handling when the multi-slot PUCCH and the single slot PUCCH overlap when the traffic types are not distinguished (for example, Rel. 15) will be described. In Aspect 1.2, the overlapping multi-slot PUCCH and single-slot PUCCH may both be eMBB-related, both may be URLLC-related, or may be a combination of eMBB and URLLC-related. However, in the UE, these traffic types do not have to be distinguished.

(Aspect 1.2.1) First Collision Handling

In first collision handling, the UE may perform collision handling between a multi-slot PUCCH and a single-slot PUCCH overlapping in the same slot based on at least one of the UCI type (for example, HARQ-ACK, SR, first CSI, second CSI, or the like) and a start timing of repetition.

FIGS. 6A and 6B are diagrams illustrating an example of collision handling according to Aspect 1.2.1. When the UCI priority included in the multi-slot PUCCH #1 and the UCI priority included in the single slot PUCCH #2 are the same, in the slot #1 in which overlapping occurs, the UE may transmit the multi-slot PUCCH #1 that has started in the earlier slot, and does not have to transmit the single slot PUCCH #2 that has started in the later slot, as illustrated in FIG. 6A.

On the other hand, when the priority of the UCI included in the multi-slot PUCCH #1 and the priority of the UCI included in the single slot PUCCH #2 are different, in the slot #1, as illustrated in FIG. 6B, the UE may transmit the PUCCH including the UCI having a high priority and does not have to transmit the PUCCH including the UCI having a low priority.

Here, the priority of the UCI type may be determined in the order of HARQ-ACK>SR>first CSI>second CSI, for example. For example, in FIG. 6B, since the multi-slot PUCCH #1 includes the SR and the single slot PUCCH #2 includes the HARQ-ACK, the UE may transmit the single slot PUCCH #2 including the HARQ-ACK having a high priority in the slot #1.

(Aspect 1.2.2) Second Collision Handling

In the second collision handling, when the multi-slot PUCCH and the single slot PUCCH overlap in the same slot, the UE may drop the single slot PUCCH.

FIG. 7A is a diagram illustrating an example of collision handling according to Aspect 1.2.2. As illustrated in FIG. 7A, in the slot #1 in which the multi-slot PUCCH #1 and the single slot PUCCH #2 overlap, the UE may transmit the multi-slot PUCCH #1 (second repetition) and does not have to transmit (may drop) the single slot PUCCH #2.

(Aspect 1.2.3) Third Collision Handling

In the third collision handling, when the multi-slot PUCCH and the single slot PUCCH overlap in the same slot, the UE may transmit the single slot PUCCH in the slot in which overlapping occurs and drop the multi-slot PUCCH.

FIG. 7B is a diagram illustrating an example of collision handling according to Aspect 1.2.3. As illustrated in FIG. 7B, the UE may transmit the single slot PUCCH #2 in the slot #1 in which the multi-slot PUCCH #1 and single slot PUCCH #2 overlap, and does not have to transmit (may drop) the multi-slot PUCCH #1 (second repetition). The UE may transmit the multi-slot PUCCH #1 in the slot in which overlapping does not occur.

(Aspect 1.2.4) Fourth Collision Handling

In the fourth collision handling, when the multi-slot PUCCH and the single slot PUCCH overlap in the same slot, the UE may multiplex the UCI included in the multi-slot PUCCH in the slot in which overlapping occurs and the UCI included in the single slot PUCCH.

According to the first aspect, collision handling can be appropriately performed when the single/multi-slot PUCCH and the single/multi-slot PUCCH overlap.

(Aspect 2)

In Aspect 2, collision handling when the single/multi-slot PUCCH and the PUSCH (single/multi-slot PUSCH) transmitted in one or a plurality of slots overlap will be described.

(Aspect 2.1) when Distinguishing Traffic Types

Collision handling when the single/multi-slot PUCCH and the single/multi-slot PUSCH overlap when the traffic types are distinguished (for example, Rel. 16) will be described.

(Aspect 2.1.1) Duplicate Between PUCCHs of Different Traffic Types

When the traffic type differs between the single/multi-slot PUCCH and the single/multi-slot PUSCH overlapping in the same slot, the UE may determine the PUCCH to be transmitted in the slot based on the priority of the traffic type.

Figure 8:
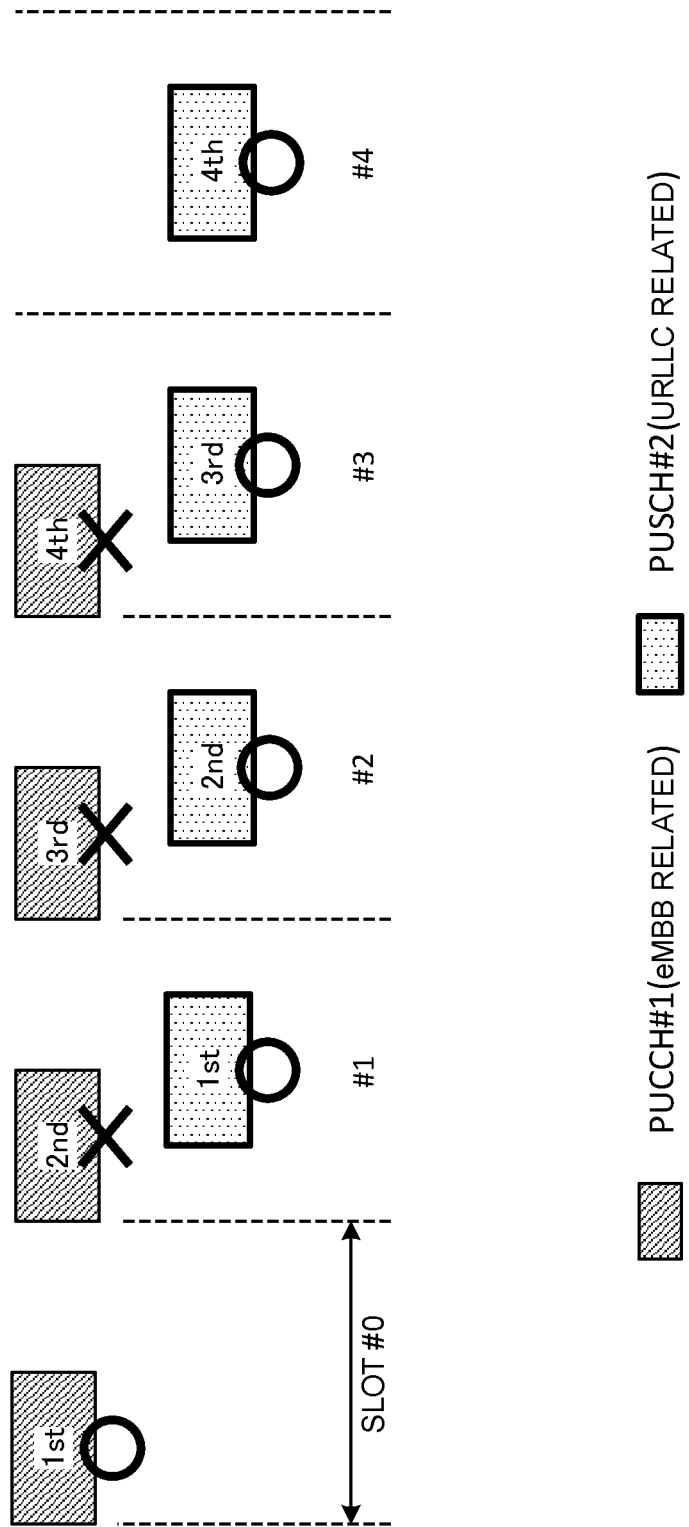
FIG. 8 is a diagram illustrating an example of collision handling between different traffic types according to Aspect 2.1.1.

FIG. 8 is a diagram illustrating an example of collision handling between different traffic types according to Aspect 2.1.1. FIG. 8 illustrates an example in which a multi-slot PUCCH #1 with a traffic type related to eMBB and a multi-slot PUSCH #2 with a traffic type related to URLLC overlap in at least one repetition (slot).

As illustrated in FIG. 8, when multi-slot PUCCH #1 and the multi-slot PUSCH #2 of different traffic types overlap in the same slots #1 to #3, in the slots #1 to #3 in which overlapping occurs, the uplink channel (for example, the multi-slot PUSCH #2) having a high priority traffic type may be transmitted and the uplink channel (for example, multi-slot PUCCH #1) of the low priority traffic type does not have to be transmitted. In this case, the UE may drop the UCI included in the multi-slot PUCCH #1.

In FIG. 8, it is assumed that the priority of the traffic type is related to URLLC>related to eMBB, but this is merely an example and may be reversed, or a priority of two or more may be provided.

(Aspect 2.1.2) Duplicate Between PUCCHs of the Same Traffic Type

Next, collision handling when the traffic types of the single/multi-slot PUCCH and the single/multi-slot PUS overlapping in the same slot are the same (for example, both are related to URLLC) will be described. The UE can perform the first to third URLLC collision handling below. When both the traffic type of the single/multi-slot PUCCH and the traffic type of the single/multi-slot PUSCH are eMBB-related, similar control to any of the first to third URLLC collision handling below may be performed, and different control from the first to third URLLC collision handling below may be performed.

(Aspect 2.1.2.1) First Collision Handling Between URLLCs

In first collision handling between URLLCs, even when the traffic types are distinguished (for example, Rel. 16), the UE may perform collision handling when the single/multi-slot PUCCH and the single/multi-slot PUSCH overlap, as similar to when the traffic types are not distinguished (for example, Rel. 15).

Specifically, when the URLLC-related multi-slot PUSCH and single-slot PUCCH overlap, the UE may multiplex the UCI (for example, at least one of HARQ-ACK, SR, and CSI) included in the single slot PUCCH in the multi-slot PUSCH of a slot that satisfies the timing conditions of the UCI, and transmit the multiplexed UCI.

When the URLLC-related multi-slot PUCCH and the multi-slot PUSCH overlap, the UE may transmit the multi-slot PUCCH and does not have to transmit the multi-slot PUSCH in the slot in which overlapping occurs.

FIGS. 9A and 9B are diagrams illustrating an example of collision handling between URLLCs according to Aspect 2.1.2.1. FIG. 9A illustrates an example in which the multi-slot PUSCH #1 and the single slot PUCCH #2 whose traffic types are related to the URLLC, overlap.

As illustrated in FIG. 9A, the UE may multiplex the UCI in the single slot PUCCH #1 (for example, at least one of HARQ-ACK, SR, and CSI) for the multi-slot PUSCH #2 of each of the slots #2 to #4 satisfying conditions after a given period from the final symbol (or a symbol next to the final symbol) of the PDSCH.

When there is no slot satisfying the conditions, the UE does not have to multiplex the UCI to the multi-slot PUSCH and does not have to transmit the single slot PUCCH #1.

FIG. 9B illustrates an example in which the multi-slot PUSCH #1 and the multi-slot PUCCH #2 whose traffic types are related to the URLLC, overlap. As illustrated in FIG. 9B, in each of the slots #2 to #4 in which the multi-slot PUSCH #1 and the multi-slot PUCCH #2 overlap, and satisfying conditions after a given period from the final symbol (or a symbol next to the final symbol) of the PDSCH, the UE may transmit the multi-slot PUCCH #1 and does not have to transmit the multi-slot PUSCH #2.

(Aspect 2.1.2.2) Second Collision Handling Between URLLCs

In the second collision handling between URLLCs, when the single/multi-slot PUCCH and single/multi-slot PUSCH related to the URLLC overlap in at least one slot (repetition), the UE may perform collision handling by using the multi-slot PUSCH that continues from the same slot as a resource for the earliest PUCCH or PUSCH (PUCCH/PUSCH resource) to the same slot as the final PUCCH/PUSCH resource.

Figure 10:
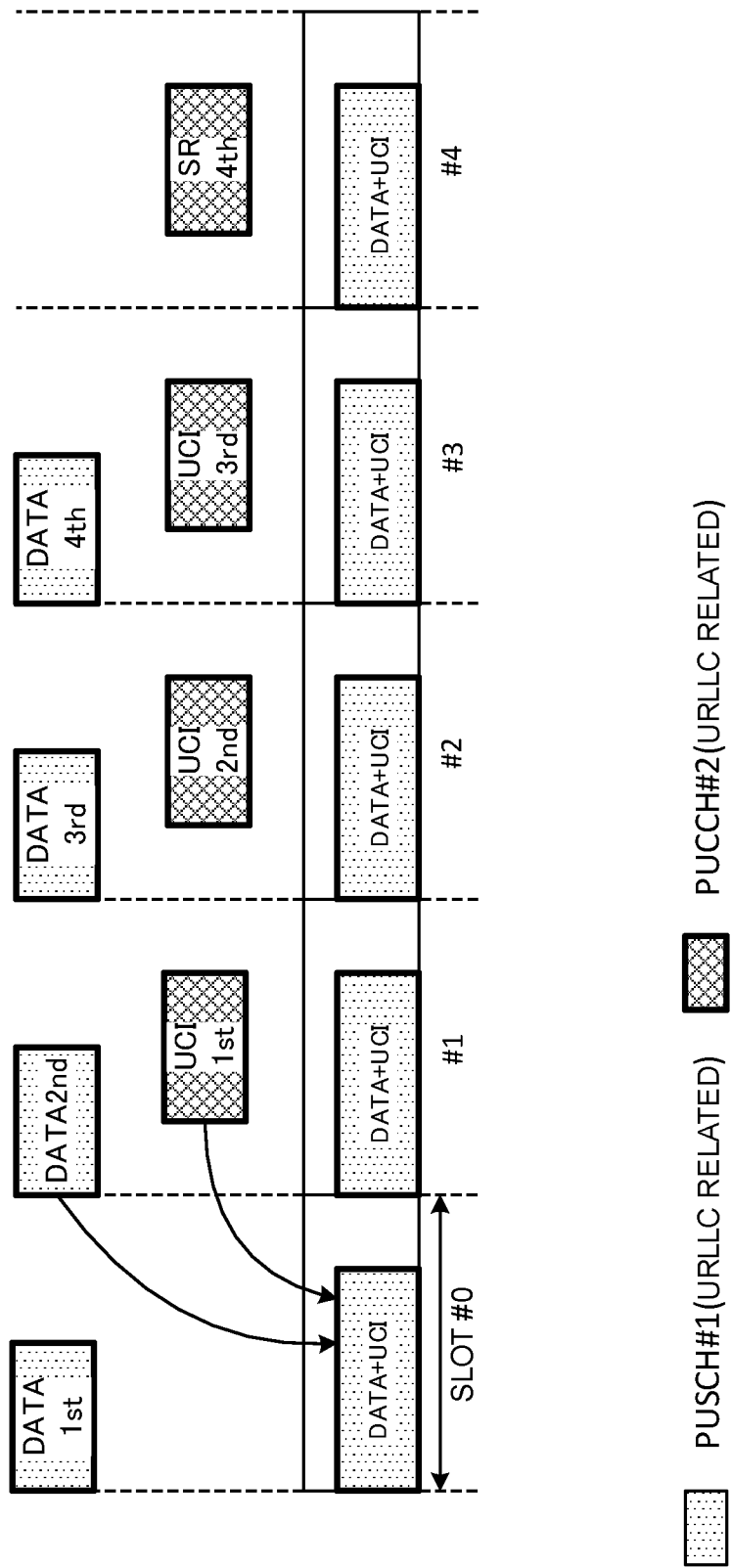
FIG. 10 is a diagram illustrating an example of collision handling between URLLCs according to Aspect 2.1.2.2.

FIG. 10 is a diagram illustrating an example of collision handling between URLLCs according to Aspect 2.1.2.2. FIG. 10 illustrates an example in which the multi-slot PUSCH #1 and the multi-slot PUCCH #2, whose traffic types are related to the URLLC, overlap in at least one repetition (slot).

As illustrated in FIG. 10, the UE may multiplex the UCI included in the multi-slot PUCCH #2 to the multi-slot PUSCH #1. The multi-slot PUSCH #1 may be repeated over five slots from the slot #0 that is same as the earliest PUCCH/PUSCH resource to the slot #4 that is the same as the final PUCCH/PUSCH resource.

For example, in FIG. 10, the UE may multiplex and transmit the HARQ-ACK included in the multi-slot PUCCH #2 repeated four times and the data of the multi-slot PUSCH #1 repeated five times.

As illustrated in FIG. 10, UCI multiplexing for multi-slot PUSCH #1 may be applied when the earliest PUCCH/PUSCH resource satisfies the above timeline conditions for UCI transmission. The timing condition for the PUSCH resource is that it is after a given period from the final symbol (a symbol next to the final symbol) in which the DCI has been received.

For example, in FIG. 10, since the earliest PUCCH/PUSCH resource (resource for multi-slot PUSCH #1 in the slot #0) satisfies the UCI timeline condition included in the multi-slot PUCCH #2, the UE may multiplex the HARQ-ACK of the multi-slot PUCCH #1 and the SR of the multi-slot PUCCH #2 in the multi-slot PUCCH #3.

On the other hand, when the earliest PUCCH/PUSCH resource (resource for the multi-slot PUCCH #1 in the slot #0) does not satisfy the UCI timeline condition included in the multi-slot PUCCH #2, the UE does not have to perform UCI multiplexing for the multi-slot PUSCH #1 illustrated in FIG. 10.

(Aspect 2.1.2.3) Third Collision Handling Between URLLCs

In third collision handling between URLLCs, when URLLC-related single/multi-slot PUCCH and single/multi-slot PUSCH overlap in at least one slot (repetition), the UE may perform collision handling for each of overlapping slots.

Figure 11:
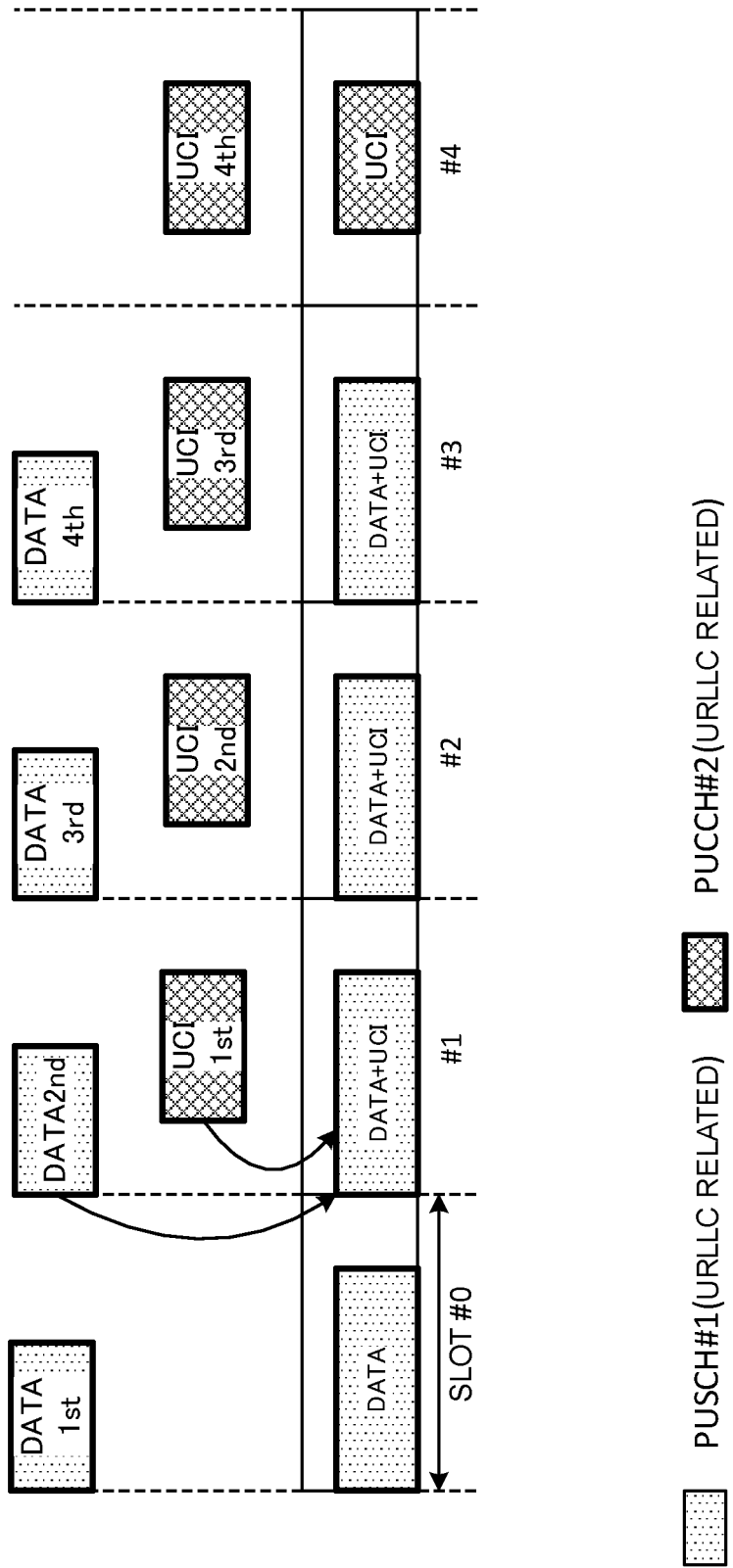
FIG. 11 is a diagram illustrating an example of collision handling between URLLCs according to Aspect 2.1.2.3.

FIG. 11 is a diagram illustrating an example of collision handling between URLLCs according to Aspect 2.1.2.3. FIG. 11 illustrates an example in which the multi-slot PUSCH #1 and the multi-slot PUCCH #2, whose traffic types are related to the URLLC, overlap in at least one repetition (slot).

As illustrated in FIG. 11, the UE may apply collision handling between the single slot PUSCH and the single slot PUCCH in each slot in which the multi-slot PUSCH #1 and the multi-slot PUCCH #2 overlap (here, the slots #1 to #3).

In collision handling between the single slot PUSCH and the single slot PUCCH, the UCI is multiplexed to the data and transmitted in the PUSCH.

For example, in FIG. 11, in each of the slots #1 to #3, the UE may multiplex UCI and data and transmit the multiplexed UCI and data by using the PUSCH #1. Channel coding may be applied separately for UCI and data.

Here, at the time of soft combining of the UCI, it is necessary that the payload size (UCI size) of the UCI is the same between repetitions. On the other hand, at the time of soft combining of data (at least one of user data and higher layer parameter), the payload size of the data (size of the data) does not have to be the same between repetitions. Therefore, when a given condition is satisfied (for example, FIG. 16), zero padding or UCI repetition may be applied to the UCI multiplexed to the multi-slot PUSCH #1 or the UCI included in the multi-slot PUCCH #2. On the other hand, zero padding or UCI repetition does not have to be applied to the data multiplexed in the multi-slot PUSCH #1.

Figure 16:
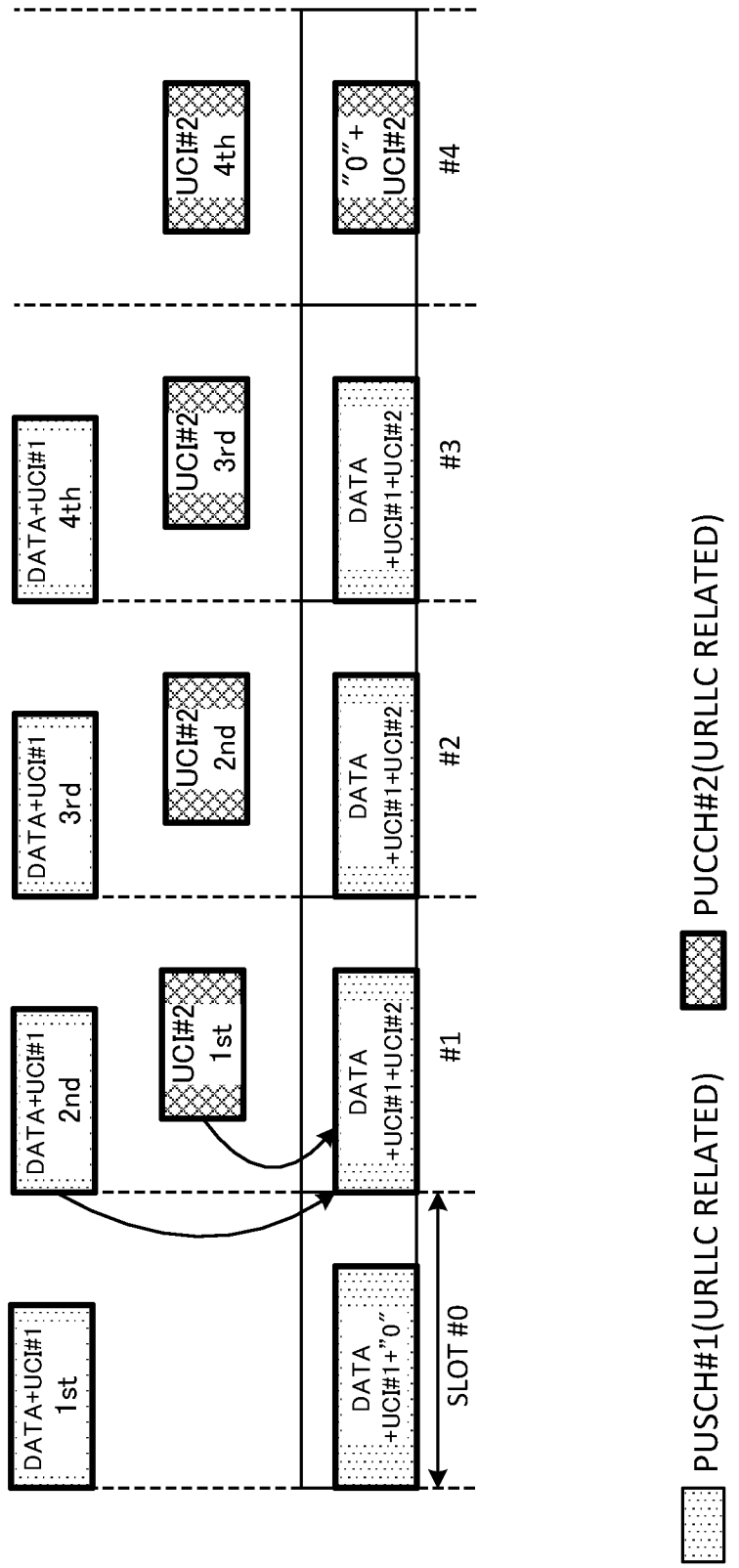
FIG. 16 is a diagram illustrating another example of collision handling between URLLCs according to Aspect 2.1.2.3.

For example, as illustrated in FIG. 16, when the UCI #2 is further multiplexed in the slots #1 to #3 with respect to the multi-slot PUSCH #1 in which the data and the UCI #1 are originally multiplexed, zero of the number of bits equal to the number of bits of the UCI #2 may be inserted to the UCI multiplexed to the multi-slot PUSCH #1 of the slot #0, so as to be equal to the total size of the UCI #1 and #2. On the other hand, the UCI transmitted in the PUCCH #2 in the slot #4 may be inserted with zero of the number of bits equal to the number of bits of the UCI #1 so as to be equal to the total size of the UCI #1 and #2.

(Aspect 2.1.2.4) Change Example

In the second and third collision handling between URLLCs, when the multi-slot PUSCH is scheduled before indicating the PUCCH, the PUSCH resource may be extended (increased) in at least one of the time domain and the frequency domain.

For example, the PUSCH resource may be controlled based on an expression to maintain the code rate, and may be controlled based on a given field included in the received DCI, or a new format DCI.

According to the second aspect, collision handling can be appropriately performed when the single/multi-slot PUCCH and the single/multi-slot PUSCH overlap.

(Radio Communication System)

A configuration of a radio communication system according to one embodiment of the present disclosure is hereinafter described. In this radio communication system, communication is performed using any one of the radio communication methods according to the embodiments of the present disclosure or a combination thereof.

Figure 12:
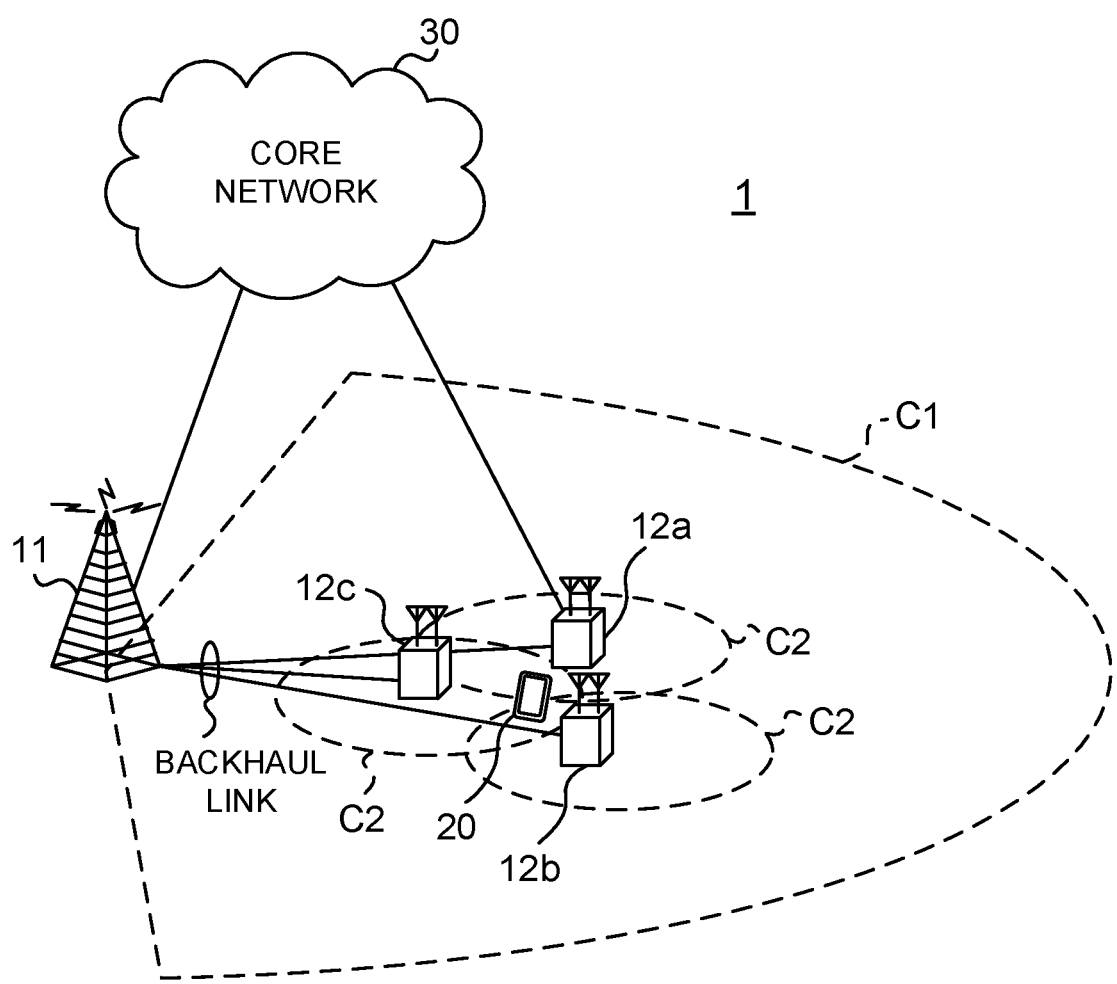
FIG. 12 is a diagram illustrating an example of a schematic configuration of a radio communication system according to an embodiment.

FIG. 12 is a diagram illustrating an example of a schematic configuration of a radio communication system according to an embodiment. A radio communication system 1 may be a system that implements communication using long term evolution (LTE), 5th generation mobile communication system new radio (5G NR), and the like specified by third generation partnership project (3GPP).

Further, the radio communication system 1 may support dual connectivity (multi-RAT dual connectivity (MR-DC)) between a plurality of radio access technologies (RATs). MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, an NR base station (gNB) is MN, and an LTE (E-UTRA) base station (eNB) is SN.

The radio communication system 1 may support dual connectivity between a plurality of base stations in identical RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be located in at least one cell. The arrangement, number, and the like of cells and the user terminals 20 are not limited to the aspects illustrated in the drawings. Hereinafter the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation and dual connectivity (DC) using a plurality of component carriers (CC).

Each CC may be included in at least one of a frequency range 1 (FR1) and a frequency range 2 (FR2). The macro cell C1 may be included in FR1, and the small cell C2 may be included in FR2. For example, FR1 may be a frequency band of 6 GHz or less (sub-6 GHz), and FR2 may be a frequency band higher than 24 GHz (above-24 GHz). Note that the frequency bands, definitions, and the like of FR1 and FR2 are not limited to these, and for example, FR1 may be a frequency band higher than FR2.

The user terminal 20 may perform communication in each CC using at least one of time division duplex (TDD) and frequency division duplex (FDD).

The plurality of base stations 10 may be connected by wire (for example, an optical fiber or an X2 interface in compliance with common public radio interface (CPRI)) or by radio (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

A base station 10 may be connected to a core network 30 via another base station 10 or directly. The core network 30 may include, for example, at least one of evolved packet core (EPC), 5G core network (5GCN), next generation core (NGC), and the like.

The user terminal 20 may correspond to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by the user terminals 20, a physical broadcast channel (PBCH), a physical downlink control channel (PDCCH), or the like may be used.

In the radio communication system 1, as an uplink channel, a physical uplink shared channel (PUSCH) shared by the user terminals 20, a physical uplink control channel (PUCCH), a physical random access channel (PRACH), or the like may be used.

PDSCH transmits user data, higher layer control information, system information block (SIB), and the like. PUSCH may transmit user data, higher layer control information, and the like. PBCH may transmit master information block (MIB).

PDCCH may transmit lower layer control information. The lower layer control information may include, for example, downlink control information (DCI) including scheduling information of at least one of PDSCH and PUSCH.

Note that DCI that schedules PDSCH may be referred to as DL assignment, DL DCI, or the like, and DCI that schedules PUSCH may be referred to as UL grant, UL DCI, or the like. Note that PDSCH may be replaced with DL data, and PUSCH may be replaced with UL data.

A control resource set (CORESET) and a search space may be used to detect PDCCH. CORESET corresponds to a resource that searches for DCI. The search space corresponds to a search area and a search method for PDCCH candidates. One CORESET may be associated with one or more search spaces. UE may monitor CORESET associated with a certain search space based on search space configuration.

One SS may correspond to a PDCCH candidate corresponding to one or more aggregation levels. One or more search spaces may be referred to as a search space set. Note that "search space", "search space set", "search space configuration", "search space set configuration", "CORESET", "CORESET configuration", and the like in the present disclosure may be replaced with each other.

By means of PUCCH channel state information (CSI), delivery confirmation information (for example, hybrid automatic repeat request (HARQ-ACK), which may be referred to as ACK/NACK or the like), scheduling request (SR), and the like may be transmitted. By means of PRACH, a random access preamble for establishing a connection with a cell may be transmitted.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as DL-RS.

The synchronization signal may be, for example, at least one of a primary synchronization signal (PSS) and a secondary synchronization signal (SSS). A signal block including SS (PSS or SSS) and PBCH (and DMRS for PBCH) may be referred to as an SS/PBCH block, an SSB (SS Block), and the like. Note that SS, SSB, or the like may also be referred to as a reference signal.

In the radio communication system 1, a sounding reference signal (SRS), a demodulation reference signal (DMRS), and the like may be transmitted as an uplink reference signal (UL-RS). Note that DMRS may be referred to as a UE-specific reference signal.

(Base Station)

Figure 13:
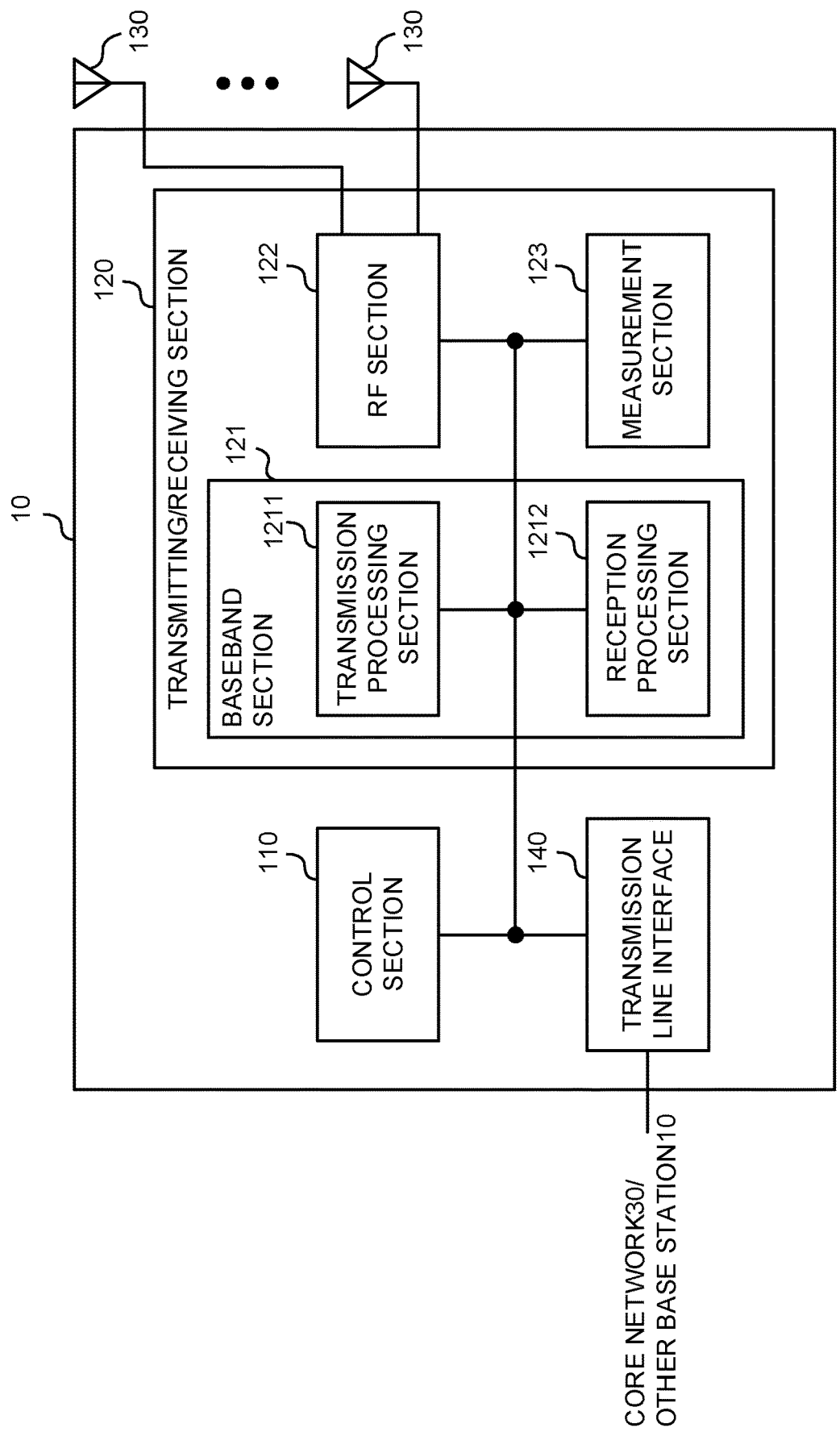
FIG. 13 is a diagram illustrating an example of a configuration of a base station according to an embodiment.

FIG. 13 is a diagram illustrating an example of a configuration of a base station according to an embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 120 may be constituted as an integrated transmitting/receiving section, or may be constituted by a transmitting section and a receiving section. The transmitting section may be constituted by the transmission processing section 1211 and the RF section 122. The receiving section may be constituted by the reception processing section 1212, the RF section 122, and the measurement section 123.

The transmission/reception antenna 130 can be constituted by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data acquired from the control section 110 or control information to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), signal to interference plus noise ratio (SINR), or signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmitting section and the receiving section of the base station 10 in the present disclosure may be constituted by at least one of the transmitting/receiving section 120, the transmission/reception antenna 130, and the transmission line interface 140.

The transmitting/receiving section 220 receives the uplink control channel or the uplink shared channel. Further, the transmitting/receiving section 220 receives the uplink control information by using the uplink control channel or the uplink shared channel. The transmitting/receiving section 220 transmits the downlink control channel or the downlink shared channel.

(User Terminal)

Figure 14:
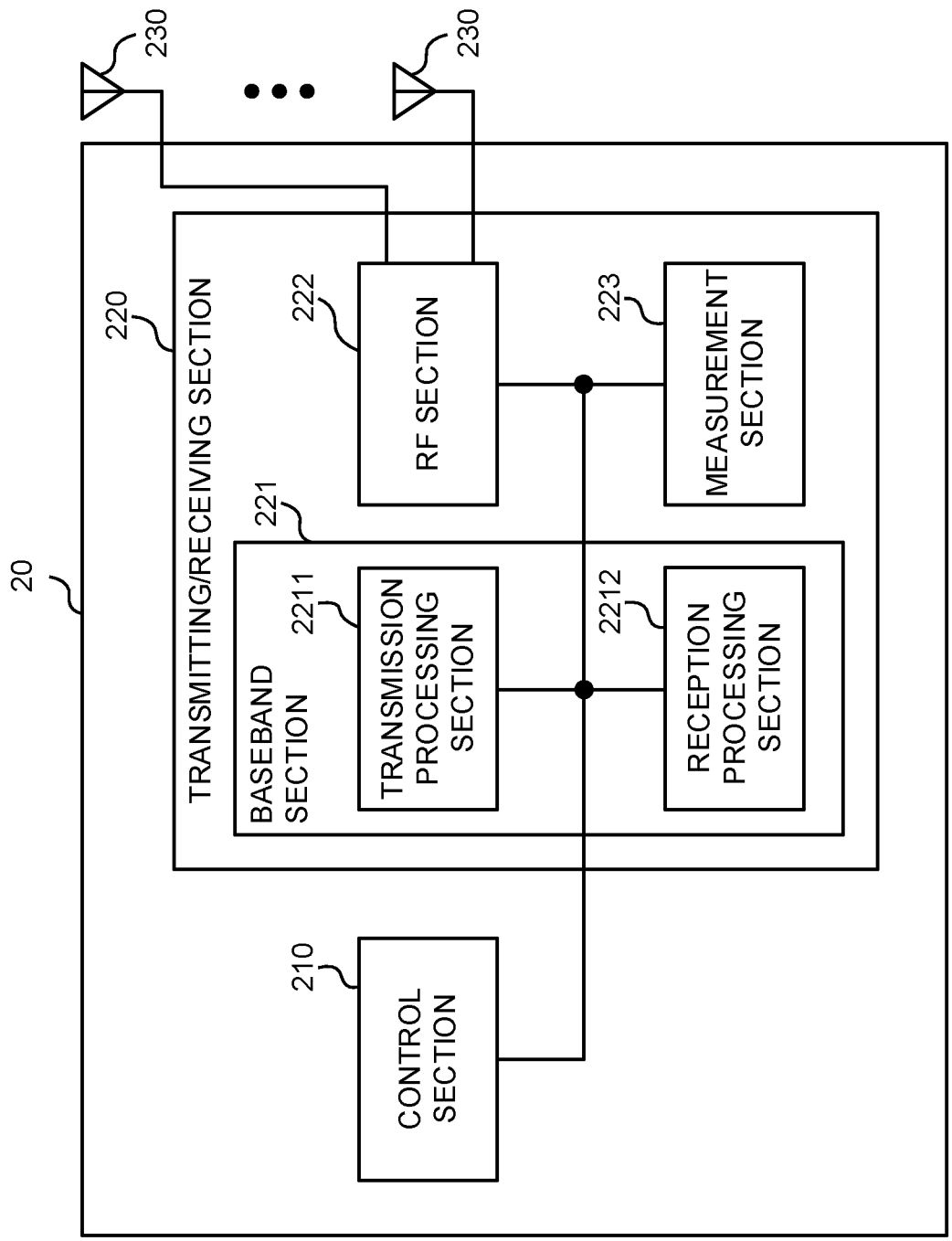
FIG. 14 is a diagram illustrating an example of a configuration of a user terminal according to an embodiment.

FIG. 14 is a diagram illustrating an example of a configuration of a user terminal according to an embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes a functional block which is a characteristic part of the present embodiment, it may be assumed that the user terminal 20 also has another functional block necessary for radio communication. A part of processing of each section described below may be omitted.

The control section 210 controls the entire user terminal 20. The control section 210 can be constituted by a controller, a control circuit, or the like, which is described based on common recognition in the technical field to which the present disclosure relates.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 220 may be constituted as an integrated transmitting/receiving section, or may be constituted by a transmitting section and a receiving section. The transmitting section may be constituted by the transmission processing section 2211 and the RF section 222. The receiving section may be constituted by the reception processing section 2212, the RF section 222, and the measurement section 223.

The transmission/reception antenna 230 can be constituted by an antenna described based on common recognition in the technical field to which the present disclosure relates, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When transform precoding is not enabled for a channel (for example, PUSCH), the transmitting/receiving section 220 (transmission processing section 2211) does not have to perform DFT processing as the transmission processing.

The transmitting/receiving section 220 (RF section 222) may perform modulation to a radio frequency band, filtering processing, amplification, and the like on the baseband signal, and may transmit a signal in the radio frequency band via the transmission/reception antenna 230.

Meanwhile, the transmitting/receiving section 220 (RF section 222) may perform amplification, filtering processing, demodulation to a baseband signal, and the like on the signal in the radio frequency band received by the transmission/reception antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmitting/receiving section 220, the transmission/reception antenna 230, and the transmission line interface 240.

The transmitting/receiving section 220 transmits the uplink control channel or the uplink shared channel. Further, the transmitting/receiving section 220 transmits the uplink control information by using the uplink control channel or the uplink shared channel. The transmitting/receiving section 220 receives the downlink control channel or the downlink shared channel.

The control section 210 may determine an uplink control channel used for transmitting the uplink control information based on traffic types of each of a first uplink control channel and a second uplink control channel when the first uplink control channel that is transmitted repeatedly one or more times and the second uplink control channel that is transmitted repeatedly one or more times overlap in a slot (Aspect 1).

When the traffic types of each of the first uplink control channel and the second uplink control channel are the same, the control section 210 may determine the uplink control channel based on at least one of the type of uplink control information and the start timing of repetition of the first uplink control channel (Aspect 1.1.2.1).

When the traffic types of each of the first uplink control channel and the second uplink control channel are the same, the control section 210 may determine a third uplink control channel that is repeated in all slots from the earliest resource to the final resource for the first uplink control channel and the second uplink control channel, as the uplink control channel (Aspect 1.1.2.2).

When the traffic types of each of the first uplink control channel and the second uplink control channel are the same, the control section 210 may determine the third uplink control channel as the uplink control channel described above in the overlapping slots (Aspect 1.1.2.3).

When the traffic types of each of the first control channel and the second uplink control channel are different, the control section 210 may determine the uplink control channel based on the priority of the traffic type described above (Aspect 1.1.1).

When an uplink control channel that is transmitted repeatedly one or more times and an uplink shared channel that is transmitted repeatedly one or more times overlap in a slot, the control section 210 may determine an uplink channel used for transmitting the uplink control information based on traffic types of each of the uplink control channel and the uplink shared channel (Aspect 2).

(Hardware Configuration)

Note that the block diagrams that have been used to describe the above embodiments illustrate blocks in functional units. These functional blocks (configuration units) may be implemented in arbitrary combinations of at least one of hardware or software. Also, the method for implementing each functional block is not particularly limited. That is, each functional block may be achieved by a single device physically or logically aggregated, or may be achieved by directly or indirectly connecting two or more physically or logically separate devices (using wires, radio, or the like, for example) and using these plural devices. The functional block may be achieved by combining the one device or the plurality of devices with software.

Here, the functions include, but are not limited to, judging, determination, decision, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, assigning, and so on. For example, a functional block (configuration unit) that causes transmission to function may be called as a transmitting unit, a transmitter, and the like. In any case, as described above, the implementation method is not particularly limited.

Figure 15:
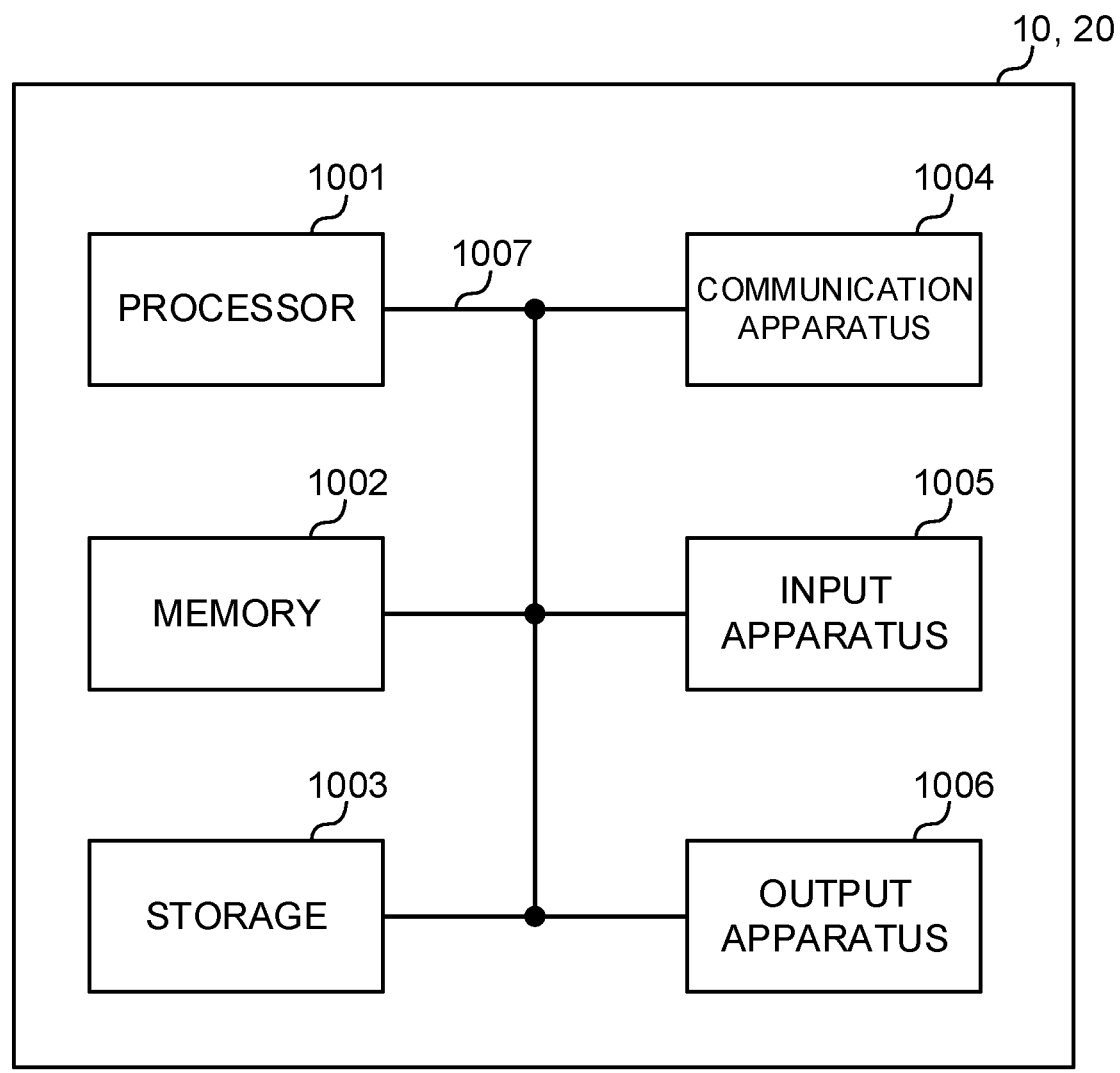
FIG. 15 is a diagram illustrating an example of a hardware configuration of a base station and a user terminal according to an embodiment.

For example, the base station, the user terminal, and so on according to one embodiment of the present disclosure may function as a computer that executes the processing of the radio communication method of the present disclosure. FIG. 15 is a diagram illustrating an example of a hardware configuration of a base station and a user terminal according to an embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the terms such as an apparatus, a circuit, an apparatus, a section, or a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is shown, a plurality of processors may be provided. Furthermore, processes may be implemented with one processor, or processes may be implemented in parallel, in sequence, or in different manners, on two or more processors. Note that the processor 1001 may be implemented with one or more chips.

Each function of the base station 10 and the user terminal 20 is implemented by, for example, reading predetermined software (program) into hardware such as the processor 1001 and the memory 1002, and by controlling the operation in the processor 1001, the communication in the communication apparatus 1004, and at least one of the reading or writing of data in the memory 1002 and the storage 1003.

The processor 1001 may control the whole computer by, for example, running an operating system. The processor 1001 may be constituted by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program codes), software modules, data, and so on from at least one of the storage 1003 or the communication apparatus 1004 into the memory 1002, and executes various processing according to these. As the program, a program to cause a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register", a "cache", a "main memory (primary storage apparatus)", and so on. The memory 1002 can store a program (program code), a software module, and the like, which are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive), a magnetic stripe, a database, a server, and/or other appropriate storage media. The storage 1003 may be referred to as "secondary storage apparatus".

The communication apparatus 1004 is hardware (transmitting/receiving device) for performing inter-computer communication via at least one of a wired network or a wireless network, and for example, is referred to as "network device", "network controller", "network card", "communication module", and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating the transmitting section 120*a* (220*a*) and the receiving section 120*b* (220*b*) from each other.

The input apparatus 1005 is an input device for receiving input from the outside (for example, a keyboard, a mouse, a microphone, a switch, a button, a sensor, and so on). The output apparatus 1006 is an output device for allowing sending output to the outside (for example, a display, a speaker, a light emitting diode (LED) lamp, and so on). Note that the input apparatus 1005 and the output apparatus 1006 may be provided in an integrated structure (for example, a touch panel).

Furthermore, these pieces of apparatus, including the processor 1001, the memory 1002, and so on are connected by the bus 1007 so as to communicate information. The bus 1007 may be formed with a single bus, or may be formed with buses that vary between pieces of apparatus.

Also, the base station 10 and the user terminal 20 may be configured to include hardware such as a microprocessor, a digital signal processor (DSP), an application-specific integrated circuit (ASIC), a programmable logic device (PLD), a field programmable gate array (FPGA), and so on, and part or all of the functional blocks may be implemented by the hardware. For example, the processor 1001 may be implemented with at least one of these pieces of hardware.

(Variations)

Note that terms described in the present disclosure and terms necessary for understanding the present disclosure may be replaced with other terms that have the same or similar meanings. For example, a channel, a symbol, and a signal (or signaling) may be replaced with each other. The signal may be a message. A reference signal can be abbreviated as an "RS", and may be referred to as a "pilot", a "pilot signal", and so on, depending on which standard applies. Furthermore, a "component carrier (CC)" may be referred to as a "cell", a "frequency carrier", a "carrier frequency", and so on.

A radio frame may be formed with one or more durations (frames) in the time domain. Each of one or more periods (frames) constituting a radio frame may be referred to as a "subframe". Furthermore, a subframe may be formed with one or multiple slots in the time domain. A subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame structure, specific filtering processing to be performed by a transceiver in the frequency domain, specific windowing processing to be performed by a transceiver in the time domain, and so on.

A slot may be formed with one or more symbols in the time domain (Orthogonal Frequency Division Multiplexing (OFDM) symbols, Single Carrier Frequency Division Multiple Access (SC-FDMA) symbols, or the like). Also, a slot may be a time unit based on numerology.

A slot may include a plurality of mini slots. Each mini slot may be formed with one or more symbols in the time domain. Also, a mini slot may be referred to as a "subslot". Each mini slot may be formed with fewer symbols than a slot. A PDSCH (or PUSCH) transmitted in a time unit larger than a mini slot may be referred to as PDSCH (PUSCH) mapping type A. A PDSCH (or PUSCH) transmitted using a mini slot may be referred to as "PDSCH (PUSCH) mapping type B".

A radio frame, a subframe, a slot, a mini slot, and a symbol all represent the time unit in signal communication. A radio frame, a subframe, a slot, a mini slot, and a symbol may be each called by other applicable names. Note that time units such as a frame, a subframe, a slot, a mini slot, and a symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe and TTI may be a subframe (1 ms) in the existing LTE, may be a period shorter than 1 ms (for example, one to thirteen symbols), or may be a period longer than 1 ms. Note that the unit to represent the TTI may be referred to as a "slot", a "mini slot", and so on, instead of a "subframe".

Here, a TTI refers to the minimum time unit of scheduling in radio communication, for example. For example, in LTE systems, the base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks, codewords, and so on, or may be the unit of processing in scheduling, link adaptation, and so on. Note that when TTI is given, a time interval (for example, the number of symbols) in which the transport blocks, the code blocks, the codewords, and the like are actually mapped may be shorter than TTI.

Note that, when one slot or one mini slot is referred to as a "TTI", one or more TTIs (that is, one or more slots or one or more mini slots) may be the minimum time unit of scheduling. Also, the number of slots (the number of mini slots) to constitute this minimum time unit of scheduling may be controlled.

TTI having a period of 1 ms may be referred to as usual TTI (TTI in 3GPP Rel. 8 to 12), normal TTI, long TTI, a usual subframe, a normal subframe, a long subframe, a slot, or the like. A TTI that is shorter than the usual TTI may be referred to as "shortened TTI", "short TTI", "partial TTI" (or "fractional TTI"), "shortened subframe", "short subframe", "mini slot", "sub-slot", "slot", or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. The number of subcarriers included in the RB may be the same regardless of the numerology, and may be 12, for example. The number of subcarriers included in the RB may be determined based on numerology.

Also, an RB may include one or more symbols in the time domain, and may be one slot, one mini slot, one subframe, or one TTI in length. One TTI, one subframe, and the like may be each formed with one or more resource blocks.

Note that one or more RBs may be referred to as a "physical resource block (PRB (Physical RB))", a "subcarrier group (SCG)", a "resource element group (REG)", a "PRB pair", an "RB pair", and so on.

Furthermore, a resource block may be comprised of one or more resource elements (REs). For example, one RE may be a radio resource field of one subcarrier and one symbol.

The bandwidth part (BWP) (which may be called partial bandwidth and the like) may represent a subset of consecutive common resource blocks (RB) for a certain numerology in a certain carrier. Here, the common RB may be specified by the index of the RB based on a common reference point of the carrier. The PRB may be defined in a BWP and numbered within that BWP.

The BWP may include a BWP for UL (UL BWP) and a BWP for DL (DL BWP). For the UE, one or more BWPs may be configured within one carrier.

At least one of the configured BWPs may be active, and the UE does not need to assume to transmit or receive a predetermined signal/channel outside the active BWP. Note that "cell", "carrier", and the like in the present disclosure may be replaced with "BWP".

Note that the structures of radio frames, subframes, slots, mini slots, symbols, and so on described above are merely examples. For example, configurations pertaining to the number of subframes included in a radio frame, the number of slots included in a subframe or a radio frame, the number of mini slots included in a slot, the number of symbols and RBs included in a slot or a mini slot, the number of subcarriers included in an RB, the number of symbols in a TTI, the symbol duration, the length of cyclic prefixes (CPs), and so on can be variously changed.

Furthermore, the information and parameters described in the present disclosure may be represented in absolute values, represented in relative values with respect to given values, or represented using other corresponding information. For example, a radio resource may be specified by a predetermined index.

The names used for parameters and so on in the present disclosure are in no respect limiting. In addition, an equation and so on using these parameters may differ from those explicitly disclosed in the present disclosure. Since various channels (Physical Uplink Control Channel (PUCCH)), Physical Downlink Control Channel (PDCCH), and so on) and information elements can be identified by any suitable names, the various names assigned to these individual channels and information elements are in no respect limiting.

The information, signals, and the like described in the present disclosure may be represented by using a variety of different technologies. For example, data, instructions, commands, information, signals, bits, symbols, and chips, all of which may be referenced throughout the herein-contained description, may be represented by voltages, currents, electromagnetic waves, magnetic fields or particles, optical fields or photons, or any combination of these.

Also, information, signals, and the like can be output at least either from higher layers to lower layers, or from lower layers to higher layers. Information, signals, and so on may be input and output via a plurality of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

The reporting of information is by no means limited to the aspects/embodiments described in the present disclosure, and may be performed using other methods. For example, notification of information in the present disclosure may be performed by using physical layer signaling (for example, downlink control information (DCI), uplink control information (UCI), higher layer signaling (for example, radio resource control (RRC) signaling, broadcast information (master information block (MIB), system information block (SIB), or the like), medium access control (MAC) signaling, another signal, or a combination thereof.

Note that physical layer signaling may be referred to as "L1/L2 (Layer 1/Layer 2) control information (L1/L2 control signals)", "L1 control information (L1 control signal)", and so on. Furthermore, the RRC signaling may be called as an RRC message, and may be, for example, an RRC connection setup message, an RRC connection reconfiguration message, and the like. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software", "firmware", "middleware", "microcode", or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSLs), and the like) or wireless technologies (infrared radiation, microwaves, and the like), at least one of these wired technologies or wireless technologies are also included in the definition of communication media.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-Co-Location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be compatibly used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier" may be used interchangeably. The base station may be called a term such as a macro cell, a small cell, a femto cell, a pico cell, and the like.

A base station can accommodate one or more (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to all or part of the coverage area of at least one of a base station or a base station subsystem that provides communication services within this coverage.

In the present disclosure, the terms "mobile station (MS)", "user terminal", "user equipment (UE)", "terminal", and the like may be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of a base station or a mobile station may be referred to as a transmitting apparatus, a receiving apparatus, a radio communication apparatus, or the like. Note that at least one of the base station or the mobile station may be a device mounted on a moving body, a moving body itself, and the like. The moving body may be a transportation (for example, a car, an airplane, and so on), an unmanned moving body (for example, a drone, an autonomous car, and so on), or a (manned or unmanned) robot. Note that at least one of the base station or the mobile station also includes a device that does not necessarily move during a communication operation. For example, at least one of the base station or the mobile station may be an IoT (Internet of Things) device such as a sensor.

Furthermore, the base stations in the present disclosure may be replaced with the user terminal. For example, each aspect/embodiment of the present disclosure may be applied to a structure in which communication between the base station and the user terminal is replaced with communication among a plurality of user terminals (which may be referred to as, for example, D2D (Device-to-Device), V2X (Vehicle-to-Everything), and so on). In this case, the user terminal 20 may be configured to have the functions of the base station 10 described above. In addition, the wording such as "up" and "down" may be replaced with the wording corresponding to the terminal-to-terminal communication (for example, "side"). For example, an uplink channel and a downlink channel may be replaced with a side channel.

Likewise, the user terminal in the present disclosure may be replaced with a base station. In this case, the base station 10 may be configured to have the functions of the user terminal 20 described above.

Certain operations that have been described in the present disclosure to be performed by base stations may, in some cases, be performed by their upper nodes. In a network comprised of one or more network nodes with base stations, it is clear that various operations that are performed so as to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, regarding the methods described in the present disclosure, elements of various steps are presented using an illustrative order, and are not limited to the presented particular order.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New Radio Access Technology (New-RAT), New Radio (NR), New radio access (NX), Future generation radio access (FX), Global System for Mobile communications (GSM; registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods, and/or next generation systems or the like that are enhanced based on these. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on".

Reference to elements with designations such as "first", "second", and so on as used in the present disclosure does not generally limit the number/quantity or order of these elements. These designations may be used in the present disclosure only for convenience, as a method for distinguishing between two or more elements. In this way, reference to the first and second elements does not imply that only two elements may be employed, or that the first element must precede the second element in some way.

The terms "judging (determining)" as used in the present disclosure may encompass a wide variety of operations. For example, "judging (determining)" may be interpreted to mean making judgements and determinations related to judging, calculating, computing, processing, deriving, investigating, looking up, search, inquiry (for example, looking up in a table, database, or another data structure), ascertaining, and so on.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory), and so on.

In addition, to "judge" and "determine" as used herein may be interpreted to mean making judgements and determinations related to resolving, selecting, choosing, establishing, comparing, and so on. In other words, to "judge" and "determine" as used herein may be interpreted to mean making judgements and determinations related to some operation.

In addition, to "judge (determine)" may be replaced with "assuming", "expecting", "considering", and so on.

The "maximum transmission power" described in the present disclosure may mean a maximum value of transmission power, nominal UE maximum transmit power, or rated UE maximum transmit power.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

As used in the present disclosure, when two elements are connected, these elements may be considered "connected" or "coupled" to each other by using one or more electrical wires, cables, printed electrical connections, and the like, and, as a number of non-limiting and non-inclusive examples, by using electromagnetic energy having wavelengths in the radio frequency, microwave, and optical (both visible and invisible) regions, or the like.

In the present disclosure, the phrase "A and B are different" may mean "A and B are different from each other". Note that the term may mean that "A and B are each different from C". The terms such as "leave", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Now, although the invention according to the present disclosure has been described in detail above, it is obvious to a person skilled in the art that the invention according to the present disclosure is by no means limited to the embodiments described in the present disclosure. The invention according to the present disclosure can be implemented with corrections and modifications, without departing from the spirit and scope of the invention defined by the recitations of claims. Consequently, the description of the present disclosure is provided for the purpose of exemplification and explanation, and has no limitative meaning to the invention according to the present disclosure.

The invention claimed is:

1. A terminal comprising:
a transmitter that transmits an uplink control channel; and
a processor coupled to a non-transitory memory, the non-transitory memory containing executable instructions that, in a case where:
a first uplink control channel transmitted repeatedly per sub-slot unit and a second uplink control channel overlap, and a priority corresponding to the first uplink control channel and a priority corresponding to the second uplink control channel are different,
performs a control to transmit one of the first uplink control channel and the second uplink control channel that has a higher priority, and
performs a control to not transmit another of the first uplink control channel and the second uplink control channel that has a lower priority.

2. The terminal according to claim 1, wherein the processor, in a case where:
the first uplink control channel overlaps an uplink shared channel, and the priority corresponding to the first uplink control channel and a priority corresponding to the uplink shared channel are different,
performs a control to transmit one of the first uplink control channel and the uplink shared channel that has a higher priority, and
performs a control to not transmit another of the first uplink control channel and the uplink shared channel that has a lower priority.

3. The terminal according to claim 2, wherein, in a case where the priority corresponding to the first uplink control channel is the same as the priority corresponding to the second uplink control channel, the processor controls a multiplexing of uplink control information (UCI) included in the first uplink control channel and in the second uplink control channel.

4. The terminal according to claim 1, wherein, in a case where the priority corresponding to the first uplink control channel is the same as the priority corresponding to the second uplink control channel, the processor controls a multiplexing of uplink control information (UCI) included in the first uplink control channel and in the second uplink control channel.

5. A radio communication method for a terminal comprising:
in a case where:
a first uplink control channel transmitted repeatedly per sub-slot unit and a second uplink control channel overlap, and a priority corresponding to the first uplink control channel and a priority corresponding to the second uplink control channel are different,
performing a control to transmit one of the first uplink control channel and the second uplink control channel that has a higher priority, and
performing a control to not transmit another of the first uplink control channel and the second uplink control channel that has a lower priority; and
transmitting the one of the first uplink control channel and the second uplink control channel that has the higher priority.

6. A base station comprising:
a receiver that receives an uplink control channel; and
a processor coupled to a non-transitory memory, the non-transitory memory containing executable instructions that, in a case where:
a first uplink control channel transmitted repeatedly per sub-slot unit and a second uplink control channel overlap, and a priority corresponding to the first uplink control channel and a priority corresponding to the second uplink control channel are different,
performs a control to receive one of the first uplink control channel and the second uplink control channel that has a higher priority without receiving another of the first uplink control channel and the second uplink control channel that has a lower priority.

7. A system comprising a terminal and a base station, wherein:
the terminal comprises:
a transmitter that transmits an uplink control channel; and
a processor coupled to a non-transitory memory, the non-transitory memory containing executable instructions, that, in a case where:
a first uplink control channel transmitted repeatedly per sub-slot unit and a second uplink control channel overlap, and a priority corresponding to the first uplink control channel and a priority corresponding to the second uplink control channel are different,
performs a control to transmit one of the first uplink control channel and the second uplink control channel that has a higher priority, and performs a control to not transmit another of the first uplink control channel and the second uplink control channel that has a lower priority, and the base station comprises:
a receiver that receives the one of the first uplink control channel and the second uplink control channel.

* * * * *